(12) United States Patent
Baer et al.

(10) Patent No.: US 9,288,395 B2
(45) Date of Patent: Mar. 15, 2016

(54) SUPER-RESOLUTION BASED ON OPTICAL IMAGE STABILIZATION

(71) Applicant: Apple Inc., Cupertino, CA (US)

(72) Inventors: Richard L. Baer, Los Altos, CA (US); Damien J. Thivent, San Francisco, CA (US)

(73) Assignee: Apple Inc., Cupertino, CA (US)

(*) Notice: Subject to any disclaimer, the term of this patent is extended or adjusted under 35 U.S.C. 154(b) by 83 days.

(21) Appl. No.: 13/671,927

(22) Filed: Nov. 8, 2012

(65) Prior Publication Data

US 2014/0125825 A1 May 8, 2014

(51) Int. Cl.
*H04N 5/232* (2006.01)
*G06T 3/40* (2006.01)

(52) U.S. Cl.
CPC .......... *H04N 5/23287* (2013.01); *G06T 3/4053* (2013.01); *H04N 5/23277* (2013.01)

(58) Field of Classification Search
CPC combination set(s) only.
See application file for complete search history.

(56) References Cited

U.S. PATENT DOCUMENTS

| 7,095,434 | B1 | 8/2006 | Ikeda | |
|---|---|---|---|---|
| 7,420,592 | B2 | 9/2008 | Freeman | |
| 2005/0280714 | A1* | 12/2005 | Freeman | 348/219.1 |
| 2012/0081596 | A1* | 4/2012 | Tanaka et al. | 348/340 |
| 2012/0182472 | A1* | 7/2012 | Inata et al. | 348/374 |
| 2013/0235220 | A1* | 9/2013 | Williams | 348/208.1 |

FOREIGN PATENT DOCUMENTS

JP WO2010140515 * 12/2010 ............. G02B 13/00

OTHER PUBLICATIONS

PCT International Search Report and Written Opinion of the International Search Authority for PCT/US2013/063307 mailed Nov. 28, 2013.
Ben-Ezra M. et al., "Jitter Camera: High Resolution Video From a Low Resolution Detector", Proceedings of the 2004 IEEE Computer Society Conference on Computer Vision and Pattern Recognition, Jun. 27-Jul. 2, 2004, Washington, DC, USA, IEEE, Proceedings of the 2004 IEEE Computer Society Conference on Computer Vision and Pattern Recognition IEEE, vol. 2, Jun. 27, 2004, pp. 135-142, XP010708651.
Reimar Lenz et al., "ProgRes 3000: A Digital Color Camera with a 2D Array CCD Sensor and Programmable Resolution up to 2994×2320 Picture Elements", SPIE vol. 1357 MedTech '89: Medical Imaging, Jul. 11, 1990, XP055089335, DOI: 10.1117/12.23927, Retrieved from the Internet: URL: http://proceedings.spiedigitallibrary.org/data/Conferences/SPIEP/43863/204_1.pdf, retrieved on Nov. 20, 2013, Section 3.

(Continued)

*Primary Examiner* — Christopher K Peterson
(74) *Attorney, Agent, or Firm* — Blakely, Sokoloff, Taylor & Zafman LLP

(57) ABSTRACT

A system and method for creating a super-resolution image using an image capturing device. In one embodiment, an electronic image sensor captures a reference optical sample through an optical path. Thereafter, an optical image stabilization (OIS) processor to adjusts the optical path to the electronic image sensor by a known amount. A second optical sample is then captured along the adjusted optical path, such that the second optical sample is offset from the first optical sample by no more than a sub-pixel offset. The OIS processor may reiterate this process to capture a plurality of optical samples at a plurality of offsets. The optical samples may be combined to create a super-resolution image.

29 Claims, 13 Drawing Sheets

(56) References Cited

OTHER PUBLICATIONS

Ben-Ezra, Moshe, et al., "Video Super-Resolution Using Controlled Subpixel Detector Shifts", IEEE Transactions on Pattern Analysis and Machine Intelligence, vol. 27, No. 8, Jun. 2005, (pp. 977-987).
Capel, David, et al., "Computer Vision Applied to Super Resolution", Super-Resolution Image Reconstruction, Digital Vision, Ltd., May 2003, IEEE Signal Processing Magazine 1053-5888/03, (pp. 75-86).
Park, Sung C., et al., "Super-Resolution Image Reconstruction: A Technical Overview", Super-Resolution Image Reconstruction, Digital Vision, Ltd., May 2003, IEEE Signal Processing Magazine, 1053-5888/03, (pp. 21-36).
Robinson, M. D., et al., "Joint Digital-Optical Design of Super-Resolution Multi-Frame Imaging Systems", Ricoh Innovations, Menlo Park, CA, USA, Copyright 2007 Optical Society of America, (pp. 1-33).
Simon, Eric, et al., "Optical Image Stabilization with a Liquid Lens", Lyon, France, Copyright 2010 OSJ, (2 pages).
Apple Inc., "International Preliminary Report on Patentability," mailed May 21, 2015 for PCT/US2013/063307.

* cited by examiner

△ - GREEN VALUE 6010
○ - RED VALUE 6020
□ - BLUE VALUE 6010

SUPER-RESOLUTION BASED ON OPTICAL IMAGE STABILIZATION

FIELD OF INVENTION

Embodiments of the present invention relate generally to an image capturing system within a consumer electronic device and, particularly, to one having an optical image stabilization mechanism to vary an optical path to a sensor of the camera.

BACKGROUND

Typically, a camera is capable of being operated by a user without any stabilization supplementation, such as a tripod or a level surface on which to rest the camera. When a stabilization supplementation is absent, the captured image may be blurry based on movement of the camera during the capturing process. For example, a user holding a camera may involuntarily shake while capturing an image, resulting in a distorted image. This distortion is ubiquitous across all image capturing devices, including portable data and media consumer electronic devices, such as mobile telephones, tablet computers, portable media players and the like that typically include image capturing mechanisms operable as cameras.

To counteract distortion from motion while capturing an image (e.g., jittering by a user operating a camera), a camera may include an optical image stabilization (OIS) system. Such an OIS system is operable to compensate for camera motion during image capture to minimize distortion of the captured image. The OIS system accomplishes this compensation by varying the optical path to the sensor in response to movement of the camera, such as jittering by the user operating the camera. This OIS system may be implemented by translating the lens itself, or may be implemented by moving an entire module that includes both lens and sensor to compensate for the movement of the camera. In any implementation, it is paramount that the OIS system stabilizes the image projected on the sensor before the image captured by the sensor is converted into digital information.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

Figure 1:
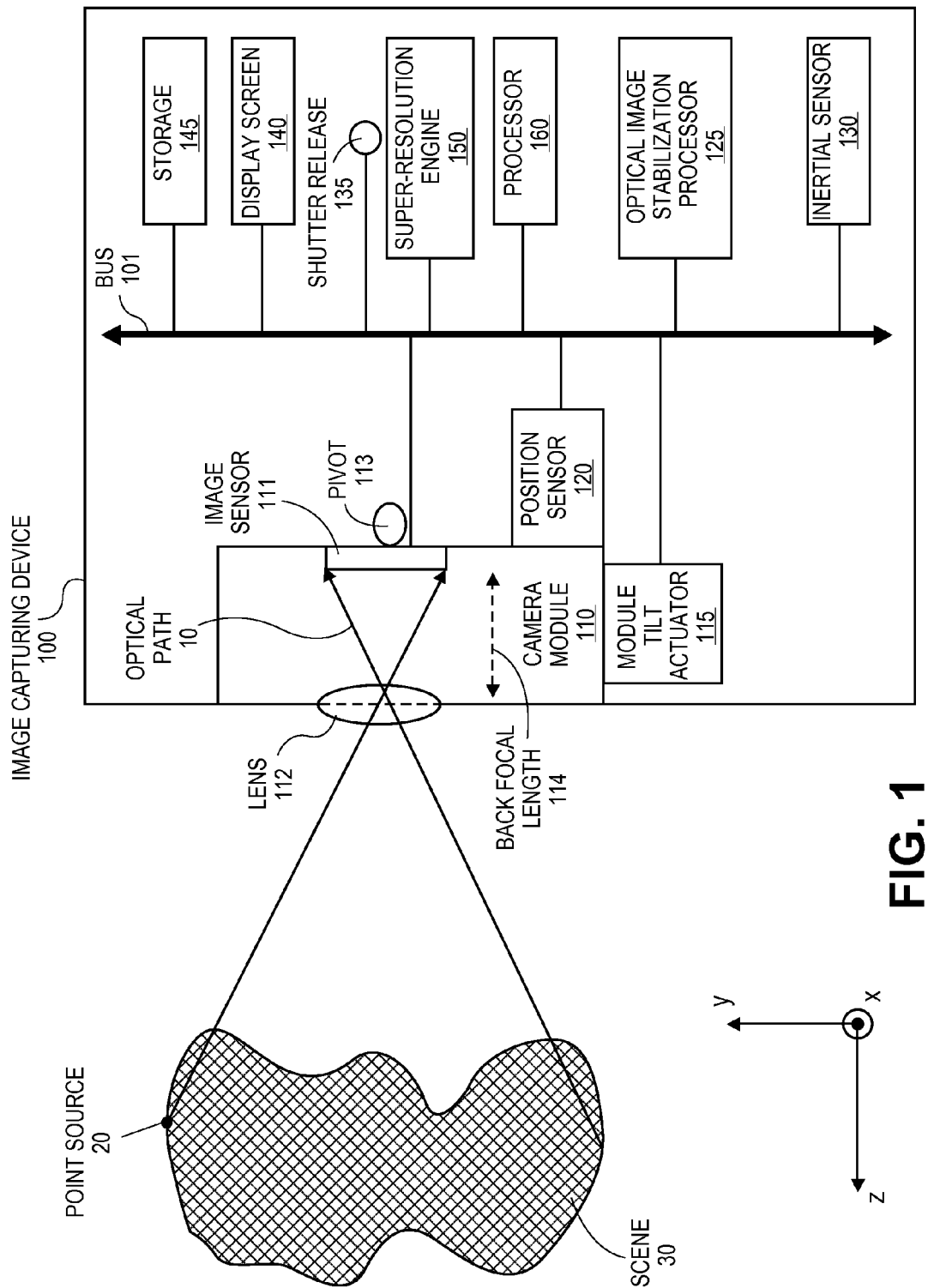
FIG. 1 is a simplified block diagram of one embodiment of an image capturing device with an optical image stabilization (OIS) system.

FIG. 1 is a simplified block diagram illustrating an image capturing device 100 employing an optical image stabilization system. The image capturing device 100 can be, but is not limited to, a digital camera or a mobile multifunction device such as a cellular telephone, a personal data assistant, a mobile entertainment device, a tablet computer, or the like. The device 100 is not limited to the enumerated embodiments and therefore can be any other consumer electronic device such as a laptop computer, a desktop computer and/or monitor, or even a television device capable of housing a camera module with an optical image stabilization system. In the interest of conscientiousness, many aspects of device 100, such as autofocus and infrared (IR) filter mechanisms, are not shown by FIG. 1.

The image capturing device 100 includes, but is not limited to, a camera module 110, an actuator 115, a position sensor 120, an optical image stabilization (OIS) processor 125, an inertial sensor 130, a shutter release 135, a display screen 140, storage 145, a super-resolution engine 150 and an processor 160. The processor 160 may drive interaction between a plurality of the components comprising device 100. The processor 160 may be any suitably programmed processor within device 100. In some embodiments, the processor 160 may be a primary processor such as a microprocessor or central processing unit (not shown). The processor 160 may communicate with the other illustrated components across a bus 101. The bus 101 can be any subsystem adapted to transfer data within the device 100. The bus 101 can be a plurality of computer buses and include additional circuitry to transfer data and generally facilitate inter-component communication.

Turning to the camera module 110, the camera module 110 incorporates many of the components necessary to capture an image, such as a lens 112 and an image sensor 111. The focal length of the camera module 112 may be fixed. In some embodiments, the back focal length 114 between lens 112 and image sensor 111 is less than four (4) millimeters (mm). Although the back focal length 114 can be as little as one (1)

mm or less. The back focal length 114 may be dictated by the z-height of the camera module 110. An infrared (IR) filter (not shown) may be included. In some embodiments, the camera module 110 features a wide field of view, such as in the range of 84° and 64°. Thus, the lens 112 may also be a wide-angle lens. However, the lens 112 may offer different fields of view in embodiments wherein the lens is a normal lens or an ultra wide angle lens. The lens 112 may also feature a relatively low f-number, such as f/4 or lower.

The image sensor 111 of the camera module 110 can be, for example, a charge-coupled device (CCD) or complementary metal-oxide-semiconductor (CMOS) sensor. The image sensor 111 collects electrical signals during a capture period as a representation of the light traveling to image sensor 111 along an optical path (e.g., the optical path 10) so that a scene 30 can be captured as an image. The scene 30 may be captured as one or more point sources 20. In some embodiments, the image sensor 111 may be coupled to an analog front end (not shown) to process the electrical signals. Image sensor 111 may employ a color filter array (CFA) so that each pixel sensor (not shown) of the image sensor 111 captures different color data. In some embodiments, the CFA is a Bayer CFA, which contains one blue sensor, one red sensor and two green sensors for every four pixel sensors.

The image sensor 111 may be operable to capture several images in succession due to several successive capture periods (n.b., the capture periods may be in rapid succession). Successive images may capture light reaching image sensor 111 across optical paths that vary from the optical path 10. The successive images may also be captured as multiple frames of a scene (e.g., video). Therefore, each image may offer unique pixel (px) array data because light will have traveled a different optical path in reaching image sensor 111. Thus, image sensor 111 may capture a plurality of datasets, each dataset comprising different pixel array data of the same scene 30.

A shutter release 135 can effect a capture period of the image sensor 111. The shutter release 135 can be a component activated by a user, such as a tactile button provided on the housing of the image capturing device 100. Alternatively or in addition to a tactile input, the shutter release 135 may be presented to the user through an interface such as a touch input of the display screen 140, as is common in cellular telephones, mobile media devices and tablet computers. The shutter release 135 can be triggered through other means as well, such as by a timer or other triggering event. A single trigger of the shutter release 135 may result in a plurality of capture periods, e.g. actuation of the shutter release 135 only once may result in the image sensor 111 capturing a plurality of separate images.

Coupled to the camera module 110 are the actuator 115 and the position sensor 120. The position sensor 120 can be a Hall-effect position sensor (and may additionally include one or more magnets (not shown)), a strain position sensor, a capacitance-type position sensor, or any other suitable position sensor. The position sensor 120 is coupled to the camera module, and may be included therein, to provide the pitch and yaw of the camera module 110. Accordingly, the pointing angle (e.g., tilt) of the camera module 110 can be accurately determined. The pointing angle may influence the optical path to the image sensor 111. In some embodiments, position sensor 120 comprises a plurality of sensors, e.g. two or more Hall elements.

The module tilt actuator 115 may adjust the pointing angle (e.g., tilt) of the camera module 110 about a pivot point 113, which can be a bearing or other suitable component. The actuator 115 may be a voice coil motor (VCM), a piezoelectric device, or other actuator suitable for implementation within an image capturing device. Preferably, the actuator 115 is one of superior accuracy. In some embodiments, the actuator 115 is operable to adjust the pointing angle of the camera module 110 from the optical path 10 to a shifted optical path (not shown) with such controlled precision that the image sensor 111 may capture an image through the shifted optical path that is offset from a first image captured along the optical path 10 by a known sub-pixel amount. To control the shift, a voltage may be applied to the actuator 115. To realize this level of precision, the actuator 115 may be sufficiently linear and free from hysteresis. In some embodiments, the actuator 115 is comprised of multiple components, e.g. an actuator to shift the pitch and an actuator to shift the yaw.

To accomplish such sub-pixel shifts of the optical path, the actuator 115 is communicatively coupled to an optical image stabilization (OIS) processor 125. The OIS processor 125 may be implemented in firmware, software or hardware (e.g., as an application-specific integrated circuit). In normal conditions, the OIS processor 125 may stabilize the image projected on the image sensor 111 before the sensor converts the image into digital information (e.g., by varying the optical path to the image sensor in response to detected movement of the device 100, such as involuntary shaking by the user holding the device 100). The OIS processor 125 may be operable to control the time and interval of image capturing by the image sensor 111. In addition to stabilizing an image projected on the image sensor 111, the OIS processor 125 is operable to displace one or more components (e.g., the camera module 110) affecting the optical path 10 by commanding a shift. The shift may be known or predetermined. In some embodiments, the OIS processor 125 is operable to apply a voltage (not shown) to the actuator 115 so that the actuator 115 may shift the optical path by adjusting the pointing angle (e.g., the tilt) of the camera module 110 (e.g., about pivot 113). An applied voltage may be a centivolt or a millivolt value so that the optical path 10 to the image sensor 111 is shifted by an accurate sub-pixel amount. The applied voltage may be known and/or predetermined so that the shift to the optical path is known or predetermined, e.g., the applied voltage may be calculated using a sub-pixel coefficient. The OIS processor 125 may also receive signals from the position sensor 120 that accurately indicate the pointing angle (e.g., tilt) of the camera module 110 influencing the optical path 10.

The OIS processor 125 may contain an algorithm that causes the OIS processor 125 to command one or more shifts of the optical path by adjusting the pointing angle of the camera module 110. The algorithm may command these shifts between rapidly successive captures of images resulting from a single activation of shutter release 135. The algorithm may have predetermined values for each shift and/or may be responsive to data received from the actuator 115, the position sensor 120, or the inertial sensor 130. In some embodiments, the offset between two images captured through two different optical paths is known with sub-pixel accuracy because the commanded shift is known and controlled (e.g., the shift may be predetermined or calculated from one or more stored sub-pixel coefficients).

In some embodiments, the OIS processor 125 evaluates one or more conditions prior to initiating a first commanded shift. For example, the OIS processor 125 may evaluate feedback (or the absence of feedback) from the inertial sensor 130 to ensure the image capturing device 100 is approximately stationary so that commanded shifts result in images having offsets known with sub-pixel accuracy (e.g., from a reference image). Additionally, the OIS processor 125 may determine that a mode of the image capturing device 100 is set to capture a plurality of images at varying offsets (e.g., a super-resolution mode setting).

The OIS processor 125 may be coupled to an inertial sensor 130. The inertial sensor 130 may be a gyroscope, accelerometer, or a combination of such elements that are operable to provide angular velocity or proper acceleration data about the image capturing device 100 which houses the camera module 110. Accordingly, the inertial sensor 130 can provide pitch and yaw signals that may be used by the OIS processor 125 to determine displacement of the image capturing device 100.

Where the image sensor 111 captures a plurality of images of the scene 30 pursuant to commanded shifts of sub-pixel accuracy, the super-resolution (SR) engine 150 may assimilate the plurality of images to create a super-resolution image of scene 30. SR engine 150 may be incorporated within an image processor or other suitable digital signal processor coupled to the image sensor 111.

Each image of the plurality of images of the scene 30 may be considered an optical sample, having a low resolution, which is used to reconstruct a representation of the scene 30 with a higher resolution than offered by an individual optical sample (e.g., a super-resolution image). The SR engine 150 may employ an algorithm to integrate information from each of the optical samples. Data from each of the optical samples can be shifted and added together to create a densely sampled image. In some embodiments, the controlled and accurately known shift of the optical path for an optical sample allows the optical sample to be projected directly onto a high resolution grid (e.g., a Cartesian plane). In such embodiments, registration of the optical sample and a reference optical sample is unnecessary because the offset for the optical sample with respect to the reference optical sample is known based on the accurately known shift of the optical path. In some embodiments, the optical samples may be registered and interpolated onto a sub-pixel grid.

The SR engine 150 may apply a deconvolution algorithm to reduce the effects of the point-spread function (PSF). The SR engine 150 may perform additional processing operations to create a super-resolution image, e.g., white-point correction, gamma correction, anti-aliasing, and other color processing techniques. The SR engine 150 may transpose, reiterate and/or omit some processes (e.g., deconvolution, color processing, projecting the optical samples onto a high resolution grid). Effectively, the SR engine 150 is operable to create a super-resolution image from a plurality of optical samples (i.e., images that each has a lower resolution). The SR engine 150 may be implemented in firmware, software or hardware (e.g., as an application-specific integrated circuit).

In some embodiments, the OIS processor 125 is precisely calibrated so that a commanded shift of the optical path to the image sensor 111 is known offset one optical sample from another optical sample to sub-pixel accuracy. For example, a first optical sample captured at the optical path 10 may have a zero shift (e.g., a reference shift) and may be used as the reference optical sample. Before capturing a second optical sample, the OIS processor 125 may command a shift of the optical path to the image sensor 111 of one half (0.5) pixel to the right along the horizon plane (e.g., by applying a calculated or predetermined voltage to an actuator). Therefore, the offset of the second optical sample with respect to the reference optical sample is already known −0.5 pixels to the right. Accordingly, the SR engine 150 may skip registering the optical samples where the controlled shift between each optical samples is known. In such embodiments, the SR engine 150 may create the super-resolution image using any suitable super-resolution algorithm (e.g., projecting the optical samples directly onto a high resolution grid).

The image capturing device 100 includes storage 145 that may be operable to store one or more images (e.g., optical samples) captured by image sensor 111. Storage 145 may be volatile memory, such as static random access memory (SRAM) and/or dynamic random access memory (DRAM). Alternatively or in addition to volatile memory, storage 145 may include non-volatile memory, such as read-only memory (ROM), flash memory, and the like. Furthermore, storage 145 may include removable storage devices, such as secure digital (SD) cards. Storage 145 may additionally provide storage of computer readable instructions, data structures, application modules, and other data for image capturing device 100. Accordingly, while storage 145 is illustrated as a single component, storage 145 may comprise a plurality of separate components (e.g., RAM, flash, removable storage, etc.).

The display screen 140 graphically presents data of the image capturing device 100 to the user. This data may be retrieved from storage 145 or may be directly presented (e.g., from super-resolution engine 150). The display screen 140 can be a liquid crystal display (LCD), light emitting polymer display (LPD), or other display technology.

In some embodiments, the display screen 140 is a capacitive or resistive touch screen and may be sensitive to haptic and/or tactile contact with a user. In such embodiments, the display screen 140 can comprise a multi-touch-sensitive display. Accordingly, the display screen 140 may accept input from a user through a touch display screen (e.g., a capacitive touch screen or a resistive touch screen). In some embodiments in which the display screen 140 accepts user input, the shutter release 135 may be presented to the user thereat. A touch screen presentation of the shutter release 135 may not be persistent and, therefore, only presented when the image sensor 111 is operable to capture an image (e.g., when the image capturing device 100 is in camera mode).

The image capturing device 100 may comprise additional means for user input beyond a touch screen. Thus, user input can be received at the device 100 through tactile buttons (e.g., a keyboard), track pad, physical switch, or any combination of such components (not shown).

Figure 2A:
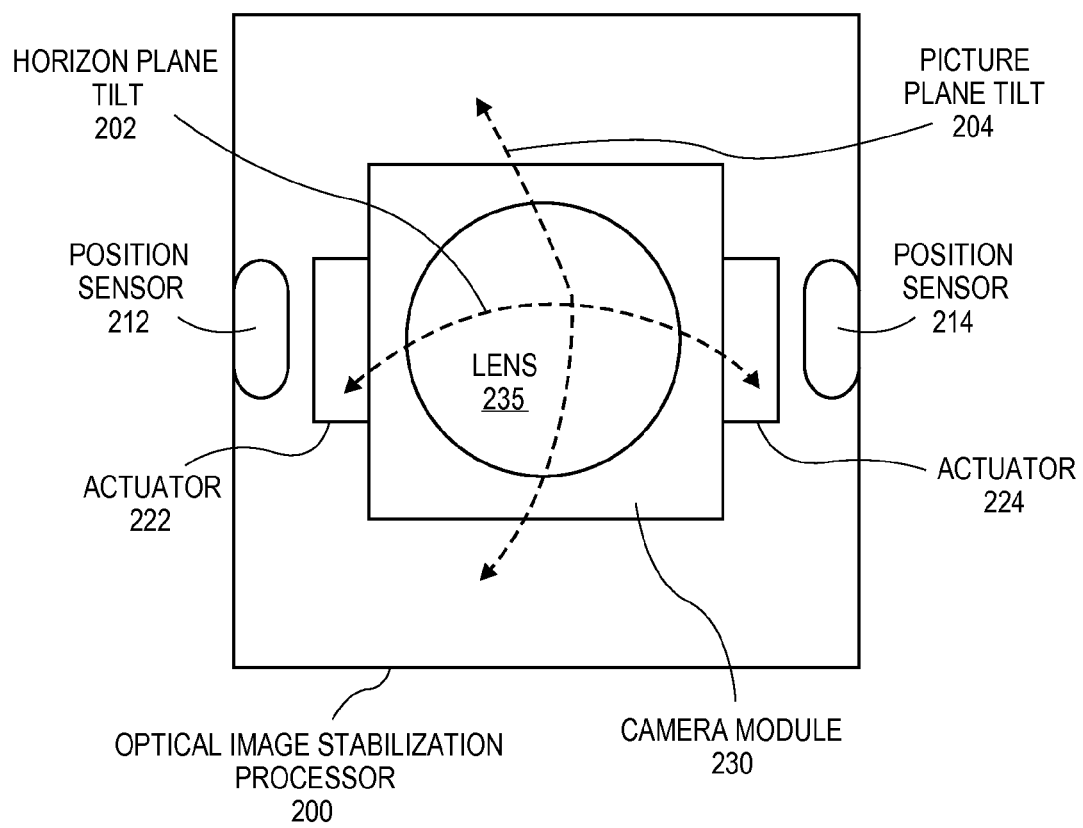
FIG. 2A is a simplified block diagram of one embodiment of a camera module that may be adjusted by an OIS processor.

FIG. 2A shows a block diagram depicting a top view of a camera module 230 with an optical image stabilization processor 200. The components illustrated at FIG. 2A may be analogous to those presented in FIG. 1: a camera module 230 with a lens 235 may be the camera module 110 with the lens 112; position sensors 212, 214 may be the position sensor 120; actuators 222, 224 may be the actuator 115; an optical image stabilization (OIS) processor 200 may be OIS processor 125. The OIS processor 200 is operable to receive input from the position sensors 212, 214 that indicate the position (e.g., pointing angle) of the camera module 230 influencing the optical path to the image sensor.

The OIS processor 200 is operable to command a shift of the camera module 230 along the horizon plane, the picture plane or both simultaneously. The OIS processor 200 may command this shift by activating the actuators 222, 224 (e.g., by applying a voltage thereto). In response, the actuators 222, 224 adjust the pointing angle of the camera module 230. The pointing angle of camera module may be adjusted about the horizon plane 202 and the picture plane 204. Consequently, the optical path to the image sensor is shifted. The shift may be calculated to sub-pixel accuracy. The actuators 222, 224 may cause this shift by pivoting camera module 230 about a pivot point, such as a bearing. A commanded shift may be approximately linear, even where the camera module 230 is tilted about a pivot point. Thus, the tilt may only appreciably shift the optical path linearly (e.g., the tilt may be less than a degree, less than an arcminute or even less than an arcsecond). Other components may be employed to adjust the pointing angle, e.g., the actuators 222, 224 may adjust the pointing angle of the camera module 230 using one or more springs. In some embodiments, the OIS process 200 is operable to determine the properties of one or more shifts commanded by the OIS processor 200.

Figure 2B:
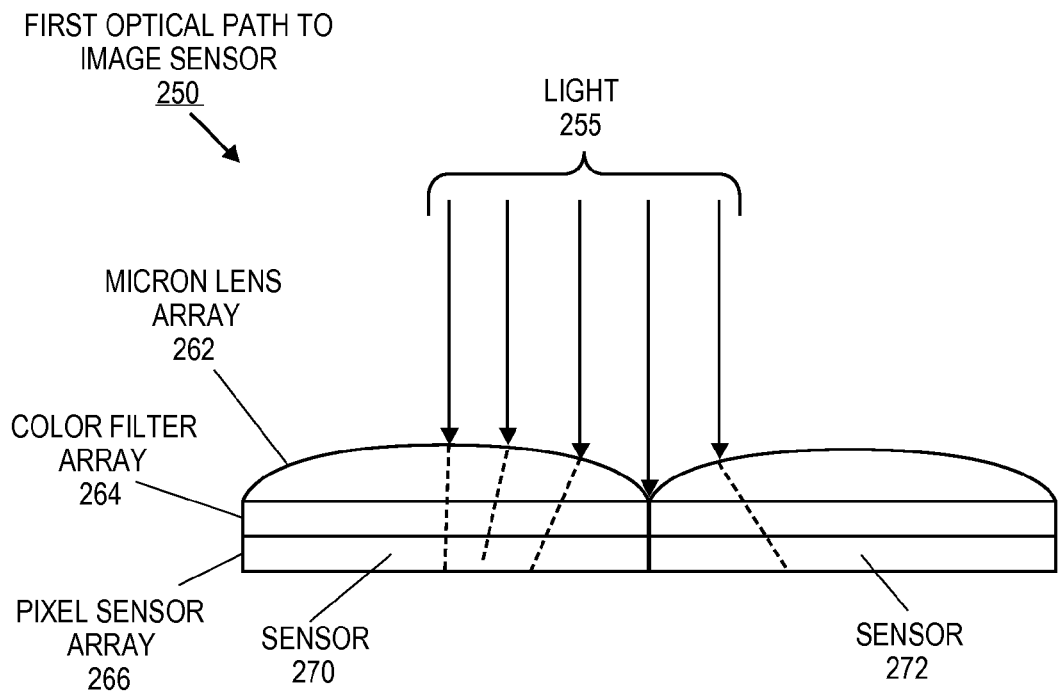
FIGS. 2B-C illustrate one example of an embodiment of adjusting the optical path with sub-pixel accuracy.
Figure 2C:
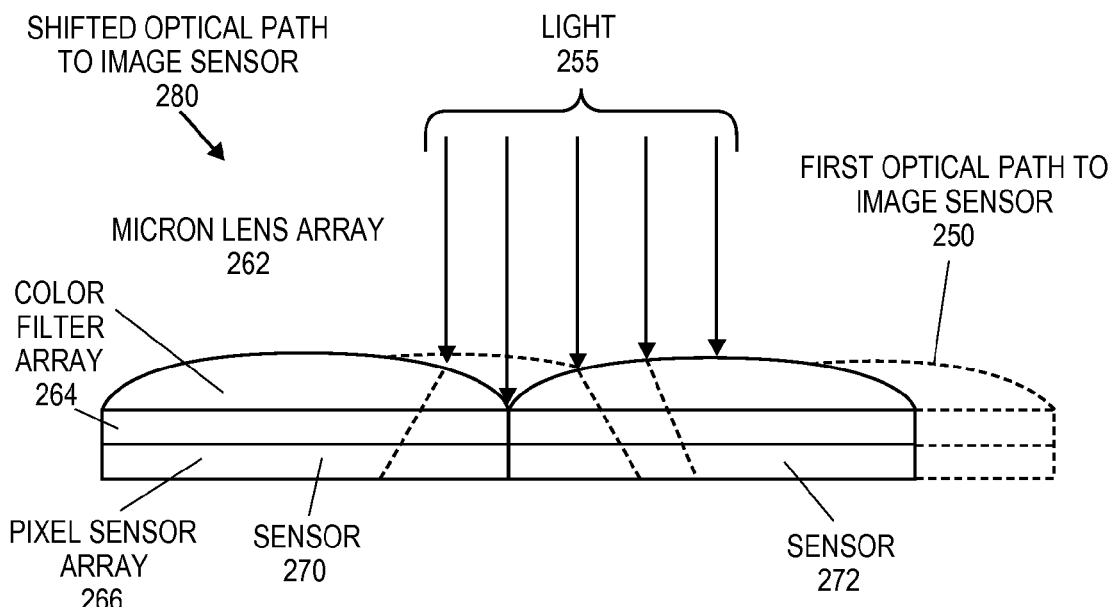

FIGS. 2B and 2C illustrate one embodiment of shifting the optical path to the image sensor with sub-pixel accuracy. In FIGS. 2B and 2C, an image sensor comprises a micron lens array 262, a color filter array 264, and a pixel sensor array 266. The image sensor may be the image sensor 111 of FIG. 1. In FIG. 2B, each ray of light 255 travels along a first optical path 250 through the optical system to the pixel sensor array 266 where it is collected as an electrical signal. Rays of light 255 may be from one or more point sources (e.g., the point source 20 of FIG. 1). As illustrated, some rays of light 255 reach a first sensor 270, whereas other rays of light 255 reach the second sensor 272. A ray of light 255 may not reach a sensor 270, 272 even though the ray reaches the surface of the micron lens array 266 (e.g., a ray that travels along the first optical path 250 which is not refracted by the micron lens array 266 to a sensor 270, 272). The rays of light 255 that reach the pixel sensor array 266 may be captured as an image. The image is comprised of electric signals representing the rays of light 255 which reach each sensor 270, 272.

FIG. 2C illustrates the light 255 traveling along a shifted optical path 280 to reach the pixel sensor array 266. The shifted optical path 280 is shifted from the first optical path 250 by 0.5 pixels. However, other sub-pixel and integer pixel shifts are possible. In some embodiments, an OIS processor (not shown), such as the OIS processor 125 of FIG. 1, is operable to command a shift of the optical path with sub-pixel accuracy, such as by adjusting the pointing angle (e.g., tilting) of a camera module (not shown) that houses the image sensor. Thus, light 255 shown at FIG. 2C travels along the shifted optical path 280 so that one of sensors 270, 272 may capture different rays of light 255 than are captured by the sensors 270, 272 through the first optical path 250 of FIG. 2B. Furthermore, some rays of light 255 that a sensor 270, 272 capture along the first optical path 250 are not captured at a sensor 270, 272 along the shifted optical path 280. As in FIG. 2B, the rays of light 255 that reach the pixel sensor array 266 in FIG. 2C may be captured as an image. The image may offer different pixel data than an image captured at FIG. 2B because the rays of light 255 may reach a different sensor 270, 272 when traveling along the shifted optical path 280.

FIG. 2C illustrates a sub-pixel shift of the optical path to the image sensor. However, a commanded shift may be approximately one pixel. Where the shifted optical path 280 is shifted from the first optical path 250 by a full pixel, light 255 may reach a different one of sensors 270, 272 through a different color filter of color filter array 264. Thus, different color data may be captured for light 255.

Figure 3:
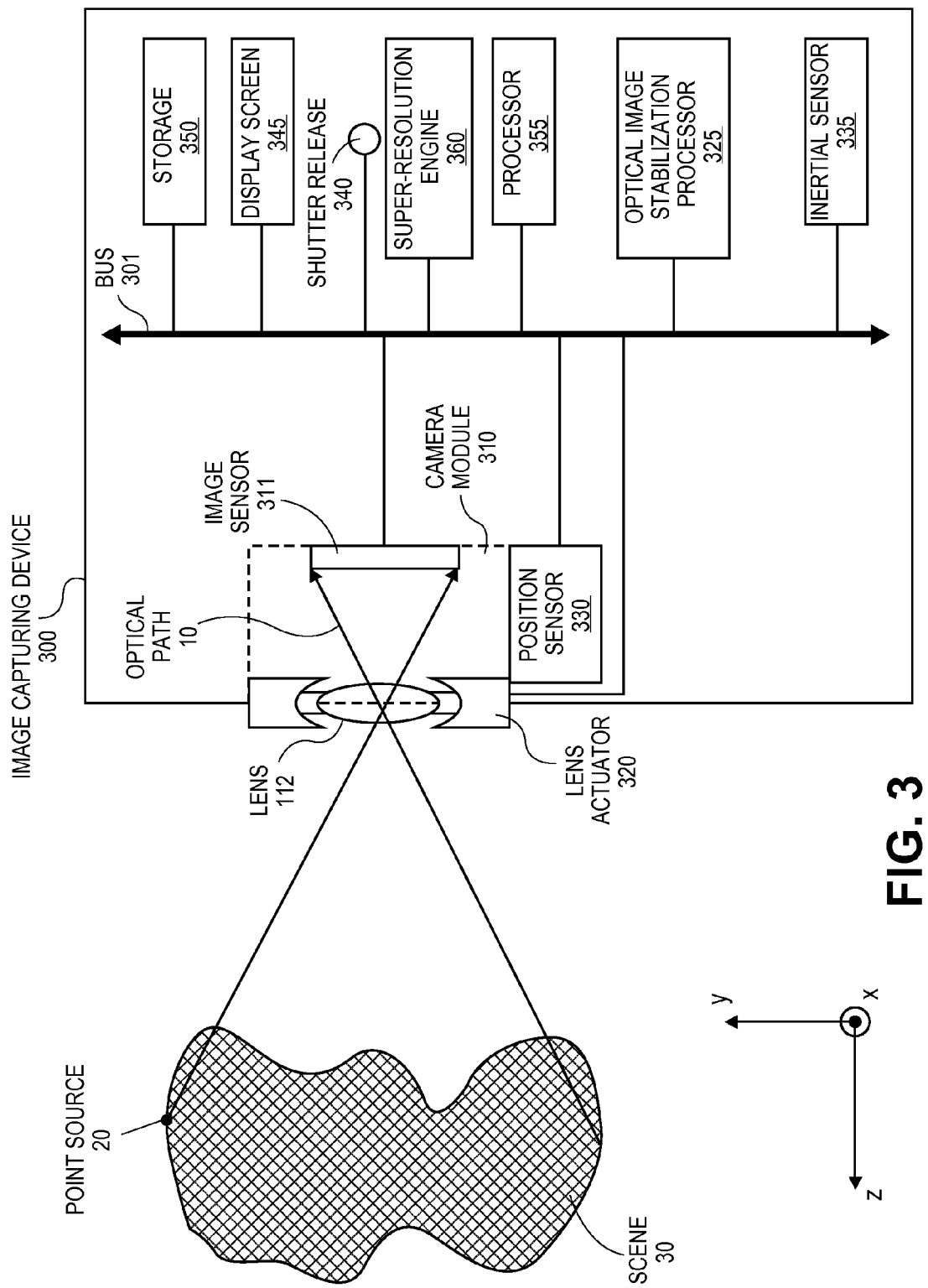
FIG. 3 is a simplified block diagram of one embodiment of an image capturing device with an OIS system.

Turning now to FIG. 3, a simplified block diagram is shown illustrating another embodiment of an image capturing device having an OIS processor. As a whole, the image capturing device 300 may be analogous to the image capturing device 100 of FIG. 1. Therefore, the image capturing device 300 may include a camera module 310 similar to camera module 110, an optical image stabilization processor 325 that can be or can include the optical image stabilization processor 125, an inertial sensor 335 that can be or can include the inertial sensor 130, a shutter release 340 that can be or can include the shutter release 135, a display screen 345 that can be or can include display screen 140, storage 350 that can be or can include storage 145, a super-resolution (SR) engine 360 that can be or can include the super-resolution engine 150, a bus 301 that can be or can include the bus 101 and a processor 355 that can be or can include the processor 160.

In the embodiment shown in FIG. 3, the lens actuator 320 is coupled to the lens 312. Accordingly, activating the lens actuator 320 by the optical image stabilization processor 325 (e.g., by applying a voltage applied thereto) may change the pointing angle influencing the optical path by translating the lens 312. The actuator 320 may comprise one or more components analogous to those described with respect to the actuator 115 (e.g., a VCM or piezoelectric device). The actuator 320 is operable to produce sufficiently linear translations of lens 312 across the horizon plane (e.g., x axis) and the picture plane (e.g., y axis). Analogous to FIG. 1, the actuator 320 is operable to shift the optical path to the image sensor 311 with sub-pixel precision. To that effect, the actuator 320 is preferably linear and free from hysteresis. However, the actuator 320 shifts the optical path by translating the lens 312.

The position sensor 330 may comprise one or more components analogous to those described with respect to the position sensor 120 of FIG. 1 (e.g., a Hall-type sensor, capacitance-type sensor, etc.). However, the position sensor 330 illustrated in FIG. 3 may be operable to detect the position of lens 312 (and/or the position of the lens 312 with respect to the image sensor 311).

The optical image stabilization (OIS) processor 325 of FIG. 3 is operable to command a shift of the optical path 10 to the image sensor 311 by commanding a translation of the lens 312. The OIS processor 325 is operable to command a precisely known shift such that an image may be captured along the shifted optical path that is offset from a reference image captured along the optical path 10 by known a sub-pixel amount. In some embodiments, the OIS processor 325 is operable to apply a voltage (not shown) to the actuator 320 so that the actuator 320 may adjust the pointing angle by translating the lens 312 in a sufficiently linear manner. An applied voltage may be less than a centivolt or even a millivolt so that the optical path 10 to the image sensor 311 is shifted by a sub-pixel amount.

Other embodiments of an image capturing device comprising an optical image stabilization processor are contemplated herein. For example, one embodiment may include a plurality of components analogous to those illustrated in FIGS. 1 and 3, but the actuator may be coupled to the image sensor. Thus, the OIS processor may be operable to command a translation of the image sensor while the lens remains stationary. The components of this embodiment may be adapted to realize a sub-pixel shift of the optical path to the image sensor. For example, the position sensor may sense a position of the image sensor (as opposed to the camera module or the lens). In other embodiments, the OIS processor may be operable to shift the optical path to the image sensor by adjusting a prism, another lens element, or any similar component which the OIS processor may command.

Figure 4:
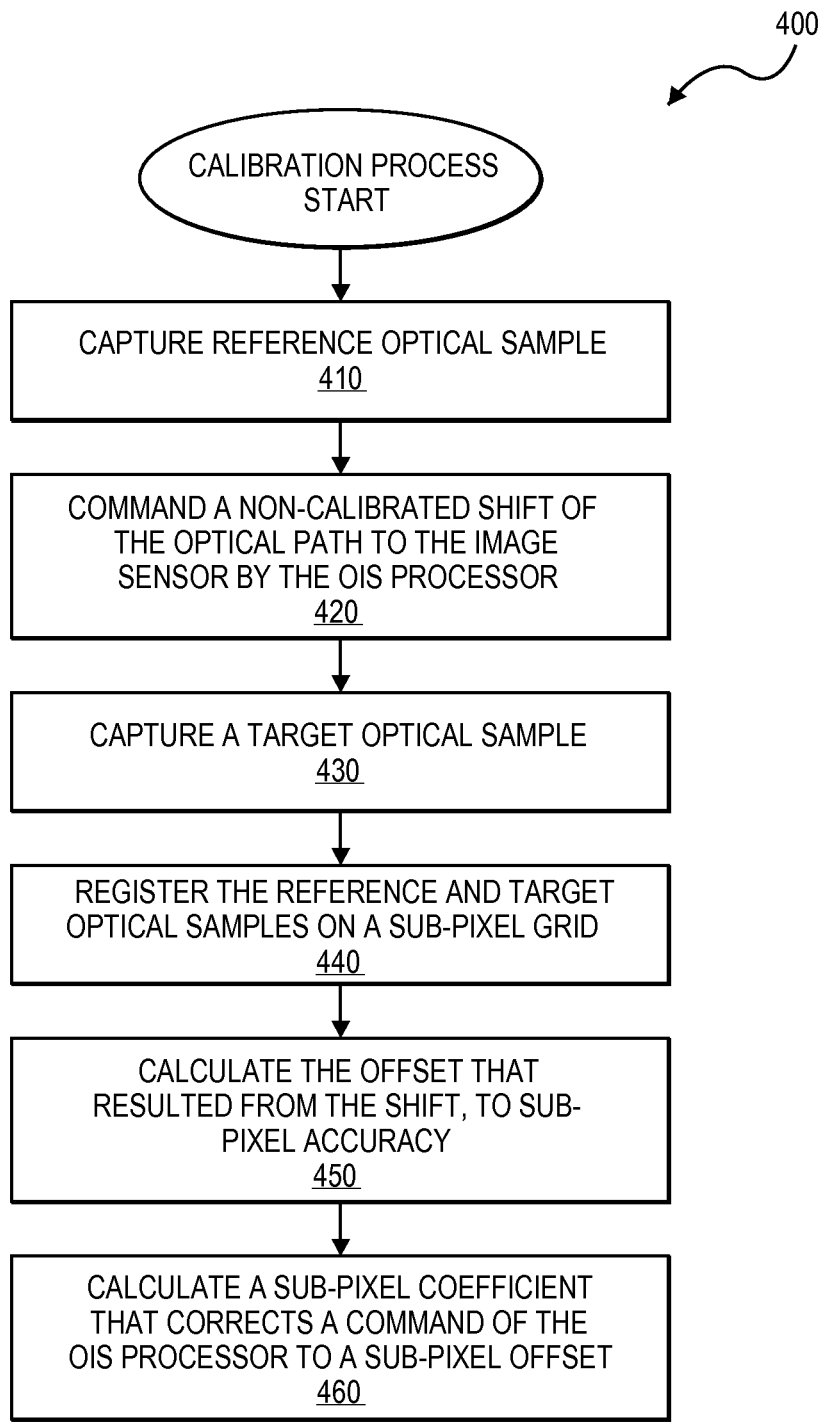
FIG. 4 is a flow diagram illustrating one example of an embodiment of a method for calibrating an OIS processor in an image capturing device.

Turning now to FIG. 4, a flow diagram is shown illustrating a method 400 for calibrating an optical image stabilization (OIS) processor in an image capturing device. The method 400 calibrates the OIS processor so that the OIS processor may command (e.g., by an actuator) a known shift of the optical path to the image sensor. This method 400 may be performed in the image capturing device 100 of FIG. 1 and/or the image capturing device 300 of FIG. 3, or other device implementing optical image stabilization.

The calibration method 400 may be performed at the point of manufacture of the device performing method 400. However, the calibration method 400 may be performed at any point thereafter. For example, the calibration method 400 may be necessary if the device is dropped and one or more values (e.g., spring constants) are affected. This calibration method may be in response to user input. For example, the device may present to the user on a display an option to perform method 400. The method 400 may also be performed automatically, e.g. when the device is stable and/or before capturing a super-resolution image.

Beginning first with operation 410, a first image is captured that is the reference optical sample. The reference optical sample provides spatial reference data to which other optical samples can be compared. Additionally, attributes of the OIS processor, position sensor, actuator and other components associated with the reference optical sample may be recorded (e.g., position sensor data, actuator data, etc.).

With a reference optical sample captured, one or more components (e.g., a camera module or lens) affecting the optical path to the image sensor is shifted (e.g., by adjusting the pointing angle through tilt or translation), resulting in a shifted optical path (operation 420). Preferably, this shift is commanded by the OIS processor. For example, the OIS processor may apply one volt to the actuator. In response, the actuator is to adjust the pointing angle of the camera module by an amount and/or in a direction commensurate with the applied voltage. Consequently, the optical path to the image sensor is shifted from the original optical path of the reference optical sample. At operation 420, the shift has not been calibrated, and so is not known with sub-pixel accuracy. Thus, although the amount of the shift (e.g., a voltage) may be commanded, the sub-pixel offset resulting from the shift is not known.

At operation 430, another optical sample is captured: a target optical sample. As method 400 is preferably performed by an approximately stationary device, this target optical sample is of the same scene as that captured in the reference optical sample. Since the optical path to the image sensor is shifted at operation 420, the target optical sample offers data about the scene from the shifted optical path. For example, the reference optical sample may be reference pixel array data having values for each pixel sensor of the image sensor. As a consequence of operation 420, the target optical sample may comprise pixel array data having values for each pixel sensor that differ from the values of the first pixel array. In some embodiments, attributes of the OIS processor, position sensor, actuator and other components associated with the target optical sample may be recorded (e.g., position sensor data, actuator data, etc.).

In one embodiment, operations 420 and 430 may be reiterated so that a plurality of target optical samples is captured. In such an embodiment, the optical path to the image sensor is shifted at operation 420 prior to capturing each additional target optical sample at operation 430. This reiteration may be necessary for a device having more than one actuator or for a device shifting an optical path along two planes independently.

With a reference optical sample and at least one target optical sample captured, the method 400 proceeds to image registration at operation 440. Here, the reference optical sample and the target optical sample are registered on a sub-pixel grid. In some embodiments, the optical samples are registered according to an area-based algorithm using cross-correlation based on similarity measures. Accordingly, a sub-pixel grid may be interpolated reflecting the correlation between the reference optical sample and the target optical sample. Image registration at operation 440 does not require the entire reference optical sample and target optical sample. Rather, respective regions of the optical samples may be used, provided the regions have good correlation properties (e.g., a region may have a strong correlation peak).

In one embodiment of image registration, a feature is identified in the reference optical sample and the centroid of that feature is identified to sub-pixel accuracy. The corresponding feature is then identified in the target optical sample and the corresponding feature's centroid is identified to sub-pixel accuracy. Other algorithms may be used in operation 440, such as an intensity-based algorithm.

At operation 450, the optical samples registered on the sub-pixel grid are used to calculate the offset that results from the commanded shift at operation 420. The offset is calculated as the displacement of the target optical sample from the reference optical sample. Preferably, this offset is calculated to sub-pixel accuracy. The upper-leftmost pixel of the reference optical sample may provide the reference origin (0, 0). The offset may be calculated as a single decimal number (e.g., a pixel value for the linear shift along one of the horizon plane and picture plane). More than one offset may be calculated for an offset along a different axis. In some embodiments, the offset is calculated as a vector or set of coordinates (y, x) where y is the offset along the picture plane and x is the offset along the horizon plane. The offset(s) may be stored as a data structure within the image capturing device.

The calculated offset(s) may be used to calculate a sub-pixel coefficient that allows the OIS processor to correct a shift of the OIS Processor to a sub-pixel offset (operation 460). This offset associates the commanded shift (e.g., a voltage applied to the actuator by the OIS processor) with the calculated offset (e.g., a pixel value). In some embodiments, the sub-pixel coefficient is the voltage-to-pixel offset (V/px) ratio. This sub-pixel coefficient may then be used by the OIS processor to accurately command a shift of the optical path to the image sensor by a known sub-pixel amount. Thus, to command a desired sub-pixel offset n, n is multiplied by the calculated sub-pixel coefficient to produce the voltage to be applied by the OIS processor. The sub-pixel coefficient may also be used to command a shift of approximately one pixel.

As an example, at operation 420 the OIS processor may apply one volt to the actuator that causes a shift of the optical path to the image sensor. The offset calculated at operation 450 may be 6.5 pixels, indicating that the target optical sample is offset from the reference optical sample by 6.5 pixels. This offset is calculated as the result of applying one volt to at least one actuator by the OIS processor at operation 420. Therefore, the voltage-to-pixel offset ratio is 1 volt to 6.5 pixels and, accordingly, the sub-pixel coefficient is 0.154 V/px. Thus, to command a known shift of one half pixel to the optical path: (0.5 px)(0.154 V/px)=77 mV.

While only one sub-pixel coefficient may be required, some embodiments may include multiple sub-pixel coefficients. In embodiments including multiple actuators, a sub-pixel coefficient may be required for each actuator. A horizontal sub-pixel coefficient may be required for the actuator causing a shift in the optical path along the horizon plane and a vertical sub-pixel coefficient may be required for the actuator causing a shift in the optical path along the picture plane. Where there is a single actuator, multiple sub-pixel coefficients may be required for each of the horizon and picture planes.

Figure 5A:
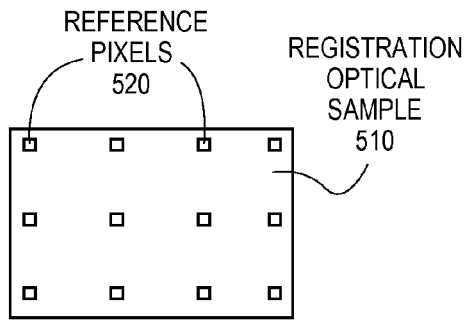
FIGS. 5A-C illustrate one example of image registration according to one embodiment of the invention.
Figure 5B:
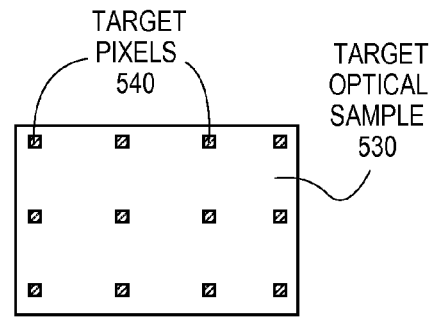
Figure 5C:
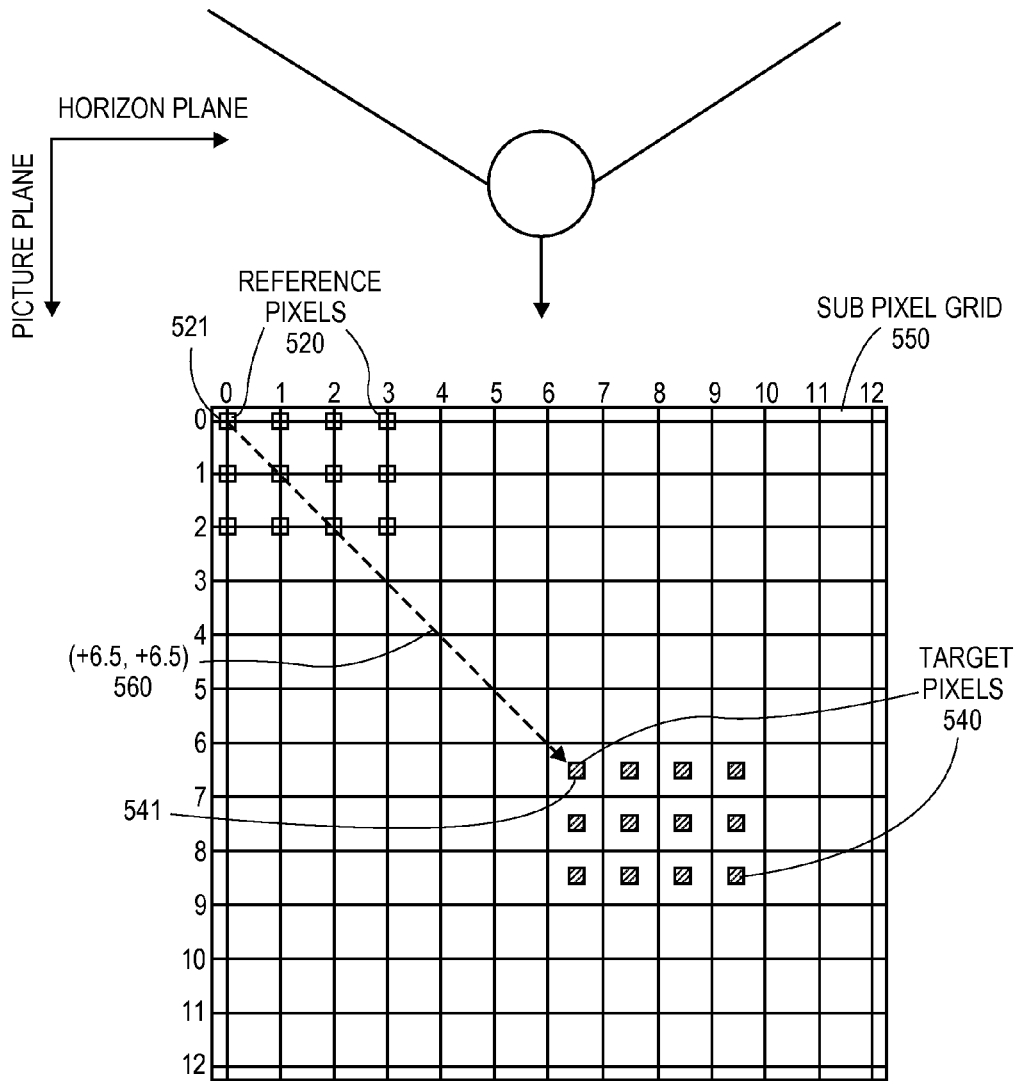

FIGS. 5A-C illustrate registering the reference optical sample and the target optical sample according to one embodiment of the method 400 of FIG. 4. In FIGS. 5A and 5B, the image capturing device housing the image sensor is stationary and remains pointed at the same scene. At FIG. 5A, the image sensor captures the scene as a reference optical sample 510 composed of reference pixels 520. Thereafter, the OIS processor commands the actuator to cause a shift of the optical path to the image sensor. FIG. 5B illustrates the result of the commanded shift: the image sensor captures the same scene along the shifted optical path as a target optical sample 530 composed of target pixels 540. In some embodiments, the reference optical sample 510 is a region of a first image and the target optical sample 530 is a corresponding region of a second image captured after the shift.

At FIG. 5C, the reference pixels 520 and target pixels 540 are registered on a sub-pixel grid 550 using the reference pixels 520 so that the upper leftmost reference pixel 521 is registered at the origin of the sub-pixel grid. In some embodiments, the reference pixels 520 are correlated with the target pixels 440. Thus, reference pixel 521 may be correlated with target pixel 541 to determine that the commanded shift by the OIS processor resulted in a sub-pixel offset 560 of 6.5 pixels to the right along the horizon plane and 6.5 pixels down along the picture plane. The two offsets are not necessarily the same number. As described above, different sub-pixel coefficients may correspond to horizontal and vertical linear shifts.

Figure 6A:
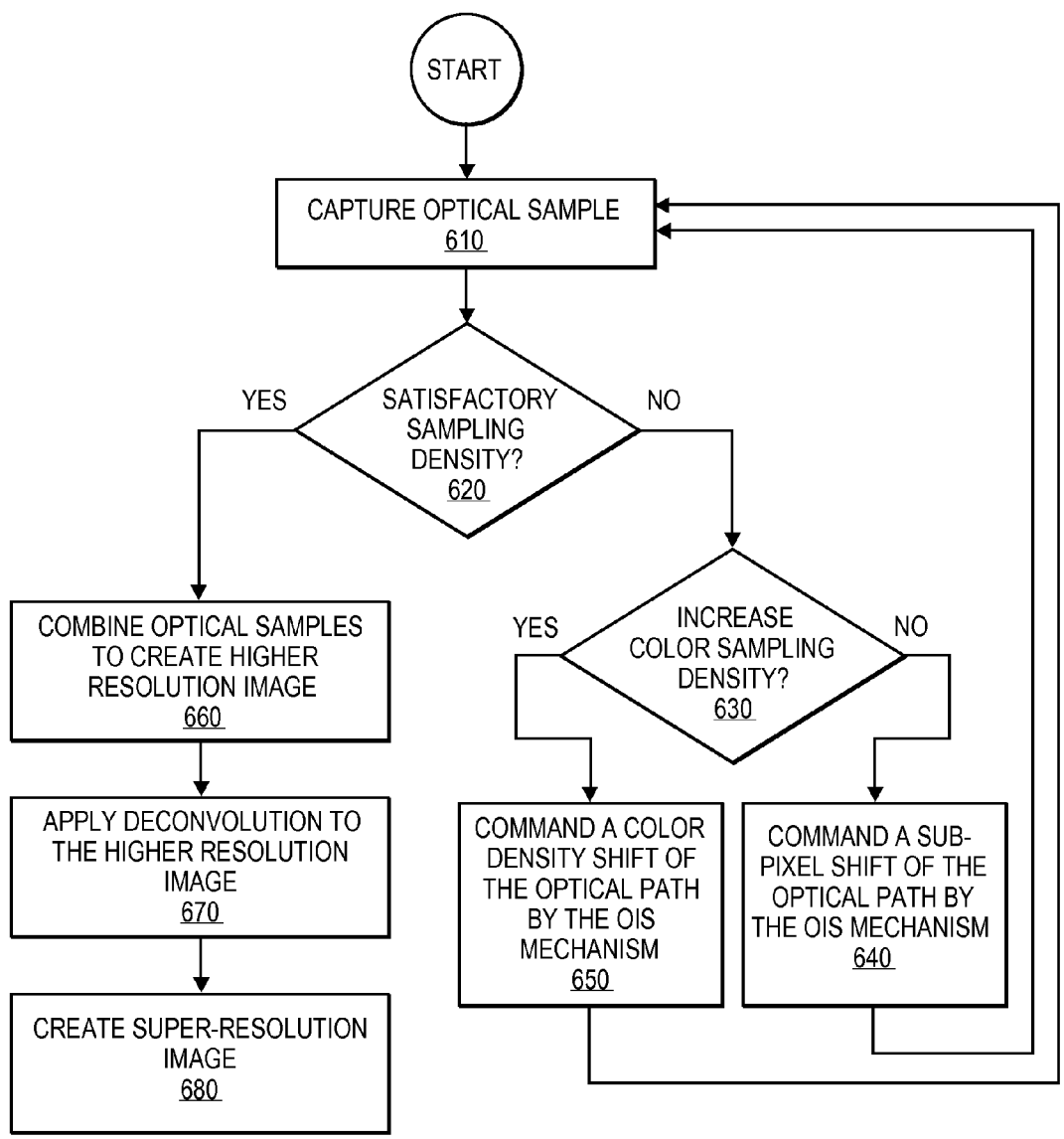
FIG. 6A is a flow diagram illustrating one example of an embodiment of a method for creating a super-resolution image using optical image stabilization.

Now with reference to FIG. 6A, a flow diagram is shown illustrating a method 600 for creating a super-resolution image from a plurality of lower-resolution images (e.g., optical samples) using an optical image stabilization (OIS) system in an image capturing device. This method 600 may be performed in the image capturing device 100 of FIG. 1 and/or the image capturing device 300 of FIG. 3, or other device implementing optical image stabilization.

In some embodiments, the image capturing device performing the method 600 is operable to perform method 400 prior to creating the super-resolution image. However, method 600 may already have one or more sub-pixel coefficients, e.g. stored in a data structure at the image capturing device. In one embodiment, the image capturing device may have stored therein precise characteristics of the one or more actuators which allow the OIS processor to command a known shift of the optical path to the image sensor. For example, the image capturing device may have stored values for one or more voltages that command one or more shifts to the optical path with sub-pixel accuracy when applied to one or more actuators. Measurements and/or calibration of the OIS processor and the actuator(s) may be performed at the point of manufacture of the device performing method 600.

The method 600 may be triggered by input from a user of the image capturing device, such as the user activating a tactile button for shutter release, or selecting an option for image capture presented to the user on a display of the image capturing device. The OIS processor may contain an algorithm to command one or more shifts, such as by regulating the shift interval, the shift direction, and the quantity of shifts.

Beginning with operation 610, the image capturing device captures an optical sample of a scene. The first optical sample captured may be used as a reference optical sample of the scene with which additional optical samples may be combined (e.g., by an SR engine). In embodiments having a Bayer CFA, the reference optical sample captures only one of red, green and blue at each pixel sensor of the image sensor. Thus, the reference optical sample may not have full color data for the scene. This reference optical sample may be stored in memory or buffered in a cache. In some embodiments, the reference optical sample is provided to an SR engine to be projected onto a high resolution grid.

The OIS processor may detect the pointing angle (e.g., module tilt or lens position) using one or more position sensors so that a reference position affecting the optical path is determined. The reference position may also incorporate information associated with the one or more actuators. This reference position may be retained (e.g., stored in memory, buffered in a cache, etc.). Additionally, this reference optical sample may be stored with metadata indicating that it is the reference optical sample and/or with other characteristics about the components (e.g., the position of the actuator(s), position sensor(s), etc.).

At decision block 620, it is determined if the sampling density is sufficient to discontinue capturing optical samples. This determination may vary depending upon the embodiment. The sampling density may be predetermined, such as by a stored value or data structure accessible by the OIS processor, or may be a parameter set by the user. Simply capturing a second optical sample at a sub-pixel offset is sufficient to increase the sampling density and, therefore, create a super-resolution image. Though it may be desirable to increase the sampling density further by capturing additional optical samples. For example, the pixel sampling density may be increased by a factor of four over the individual low-resolution optical samples captured by the image sensor. Accordingly, optical samples at four different sub-pixel offsets would be required, e.g., a reference optical sample at (0, 0), a first offset optical sample at (0, +0.5), a second offset optical sample at (+0.5, 0) and a third offset optical sample at (+0.5, +0.5). The pixel sampling density factor may be a stored value (e.g., a value stored in a data structure of the OIS processor).

In some embodiments, it is desirable to minimize or bypass altogether demosaicing (i.e., reconstructing a full color image from the optical samples captured by an image sensor overlaid with a color filter array). To realize this, an optical sample must be captured at each offset (including the reference optical sample having a zero offset) for each color of the CFA. In such embodiments, the OIS processor determines if the color sampling density is to be increased (decision block 630). This decision block 630 may not be incorporated in all embodiments. Rather, a full color super-resolution image may be interpolated by demosaicing. In embodiments not incorporating full color sampling (therefore omitting decision block 630), the method 600 proceeds directly to operation 640.

At operation 640, the OIS processor of the device performing the method 600 is operable to command a known shift of the optical path to the image sensor by adjusting one or more components (e.g., translating the lens or tilting a camera module). The commanded shift at operation 640 is an accurately known sub-pixel shift that may be predetermined or calculated from stored values (e.g., a sub-pixel coefficient). The accurately known shift may be associated with an accurately known sub-pixel offset; that is, the known shift produces an optical sample at a known offset from the reference optical sample. The sub-pixel shift may be greater than one pixel, but must be a sub-pixel amount (e.g., 3.2 pixels, 10.3 pixels, etc.). The OIS processor may be operable to command this accurately known shift based on the calibration method 400 described in FIG. 4, by known characteristics of the components affecting the optical path (e.g., the actuator), or using stored values. In one embodiment, the accurate shift is a stored value (e.g., a voltage to be applied to an actuator that indicates shift magnitude and direction).

The accurately known sub-pixel shift may be calculated using a sub-pixel coefficient that may be stored in a data structure at the device performing method 600. In one embodiment, the OIS processor may use a sub-pixel coefficient to calculate the voltage which is to be applied to the actuator(s). These calculations may be done before performing method 600 and stored as data structures. The OIS processor may command the shift in response to the optical sampling circuit. In some embodiments, the OIS processor may be operable to use the reference position to determine the sub-pixel shift. Alternatively, the OIS processor may be operable to use the current position information to determine the sub-pixel shift.

Preferably, each sub-pixel shift commanded by the OIS processor differs from each of the prior sub-pixel shifts. In some embodiments, the OIS processor determines the attributes of each sub-pixel shift, such as direction, plane, magnitude and interval. Thus, unique pixel data of the scene may be captured. For example, a point source of the scene may be represented by different pixel data in different optical samples. In a simple embodiment, the OIS processor may command a sub-pixel shift of one half pixel along the horizontal plane (e.g., (0, +0.5)), the picture plane (e.g., (+0.5, 0)), or along each plane (e.g., (+0.5, +0.5)). Characteristics of the commanded shift may be stored and/or buffered to be associated with optical sample captured at that position (e.g., shift direction, shift magnitude, position sensor data, number of the shift in the sequence of shifts, etc.).

In embodiments wherein the device performing the method 600 reaches decision block 630 and the color sampling density is to be increased, the OIS processor is operable to command a shift of the optical path to the image sensor the increases the color density (operation 650). Increasing the color density may comprise shifting the optical path in sub-pixel or one-pixel amounts. By capturing an optical sample according to a shifted optical path that has been shifted from a first optical path by one pixel, a different pixel sensor of the image sensor may detect different color data for the scene (e.g., different color data for the same point source). In some embodiments, the OIS processor determines the attributes of each color-sampling shift, such as direction, plane, magnitude and interval.

In one embodiment wherein the CFA is a Bayer CFA, at least two additional optical samples would be captured for a total of three optical samples at each location: one for red, one for green and one for blue (i.e., the RGB values). For example, to increase the pixel sampling density by a factor of four and also bypass demosaicing, up to sixteen total optical samples may be necessary. Four for the RGB values of the reference optical sample at (0, 0), (0, +1), (+1, 0), (+1, +1). Four for the RGB values of the first offset optical sample at (0, +0.5), (0, +1.5), (+1, +0.5), (+1, +0.5). Four for the RGB values of the second offset optical sample at (+0.5, 0), (+1.5, +0), (+0.5, +1), +1.5, +1). Finally, four for the RGB values of the third offset optical sample at (+0.5, +0.5), (+0.5, +1.5), (+1.5, +0.5), (+1.5, +1.5). In this simple embodiment, all the optical samples may be captured by shifts corresponding to a +0.5 pixel offset (since all offsets are multiples of 0.5). In other embodiments, more shifts may be necessary.

The one-pixel offset to achieve full color sampling may vary according to the pattern of the Bayer CFA (e.g., RGBG, RGGB, etc.). Furthermore, the color sampling density technique (e.g., algorithm) implemented may collect fewer color sampling density optical samples to avoid repeatedly capturing optical samples with the green values at the same pixel location. Other one-pixel offsets may be used. In other embodiments, the one-pixel offsets for full color sampling may be dictated according to the CFA (e.g., RGBW or CYGM).

Following the commanded shift by the OIS processor, an additional optical sample is captured along the shifted optical path (revisiting operation 610). This additional optical sample is offset from the reference optical sample by either a known sub-pixel amount to increase pixel sampling density, one pixel to increase color sampling density, or by a combination of both one pixel and a sub-pixel amount to increase color sampling density at that sub-pixel offset optical sample. The position of an optical sample may be retained (e.g., stored in memory, buffered in a cache, etc.). In some embodiments, an additional optical sample is provided to an SR engine to be projected onto a high resolution grid.

An additional optical sample may be stored with metadata indicating its order in the sequence of captured images, the offset from the reference optical sample, the sampling density to which it is directed (i.e., color sampling density, pixel sampling density, or both) and/or with other characteristics about the components (e.g., the position of the actuator(s), position sensor(s), etc.).

Where it is determined that the sampling density is sufficient (at decision block 620), the optical samples are combined to create a higher resolution image (operation 660). Operation 660 may be performed by a super-resolution (SR) engine within the device performing method 600. The SR engine may combine the optical samples by projecting the optical samples onto a high resolution grid. Because the OIS processor is precisely calibrated (e.g., by a calibration method) to command an accurate sub-pixel shift (e.g., the direction and magnitude of the sub-pixel shift are known), the offsets of each optical sample are already known. Traditionally, projecting the low resolution images onto a high resolution grid requires first registering the low resolution images on a sub-pixel grid so that the offset from a reference low resolution image can be determined. Consequently, the low resolution images can only be projected onto a high resolution grid after image registration. However, image registration may be omitted from some embodiments of operation 660. By commanding an accurate shift of a known amount (operations 640 and 650, respectively), the registration of each optical sample (captured at repeated visits to operation 610) is already known. Therefore, because each optical sample is captured using a consistent coordinate system, the optical samples may be directly projected onto a high resolution grid. In some embodiments, projecting the optical samples onto a high resolution grid may comprise superimposing the optical samples captured to increase pixel sampling density. For example, the reference optical sample may be projected onto the high resolution grid such that there are gaps between each pixel from the reference optical sample. The pixels of additional optical samples captured to increase pixel sampling density may be projected onto the high resolution grid to fill in those gaps.

In embodiments wherein the color sampling density is increased (at operation 650), combining the optical samples may also comprise combining the color density optical samples (e.g., those optical samples comprising new RGB values). The color density optical samples may be combined with the pixel density optical samples so that each pixel projected onto the high resolution grid comprises a fully color sampled pixel. Accordingly, a fully sampled higher resolution image is created by combining all the optical samples. In some embodiments, the color sampling density is not increased or is incomplete, and therefore missing color samples may be interpolated at this operation 660.

At operation 670, deconvolution is applied to the higher resolution image to remove blurring and sampling artifacts. Each optical sample has some blurring across its pixel data as an effect of the point-spread function. Consequently, the higher resolution image incorporates the blurring inherent in the optical samples. The point-spread function (PSF) may be measured by the SR engine using the f-number, focal length, field height or wavelengths detected in one or more optical samples. The measured PSF may be an estimation or approximation. Once the PSF is measured, a deconvolution algorithm may be applied to the higher resolution image that may use the approximate inverse function of the PSF. In one embodiment, the deconvolution algorithm corrects blurring by using the frequency domain transform of the PSF, $H(\omega)$. Because the inverse of $H(\omega)$, $1/H(\omega)$, does not produce suitable image data at spatial frequencies where $H(\omega)$ is near zero, the deconvolution algorithm may apply Wiener deconvolution: $1/[H(\omega)+c]$, where c is a scalar value to increase the value of the denominator. The deconvolution kernel may vary spatially across the higher resolution image because the lens or the image sensor may produce more blur as the field height increases. Accordingly, different deconvolution kernels may be used to deconvolve different regions in the higher resolution image. In other embodiments, the deconvolution algorithm may use blind deconvolution or another iterative method. In this way, a deblurred higher resolution image may be created from the higher resolution image.

A super-resolution image is then created from the deblurred higher resolution image at operation 680. An SR engine may perform final processing of the deblurred higher resolution image to create this super-resolution image. The final processing may include white-point correction, balancing, gamma correction and other conventional color processing. In embodiments wherein the color sampling density has been increased, demosaicing is not necessary to create the super-resolution image. Thereafter, the super-resolution image may be presented to the user on a display of the image capturing device, stored in memory (e.g., local storage, removable storage) of the image capturing device, or uploaded across a network (e.g., sent to cloud storage or a remote server). In some embodiments, the image capturing device is operable to manage the super-resolution image according to a setting for the SR engine (e.g., automatic upload). The SR engine may manage the super-resolution image according to input received from a user. For example, the image capturing device may present to the user a list of image-management options which the user may select or modify, such as name for the super-resolution image or a storage location.

FIGS. 6B-6F illustrate capturing and projecting the optical samples onto a high resolution grid to create a super-resolution image according to one embodiment of the method 600 of FIG. 6A. In FIGS. 6B through 6E, the image capturing device housing the image sensor is pointed at the same scene. Each pixel of each optical sample 6100-6430 captures a respective one of a green value 6010, a red value 6020 and a blue value 6030. The optical samples 6100-6430 may be captured in any order (e.g., optical sample 6100 may be captured, followed by optical sample 6200, followed by optical sample 6110, and so forth until each optical sample has been captured). Each optical sample 6100-6430 is shown as only three pixels by two pixels. Thus, each optical sample 6100-6430 is not intended to represent each pixel in an optical sample, but only a region of corresponding pixels such that there are additional pixels surrounding it (e.g., a region near the center).

Figure 6B:
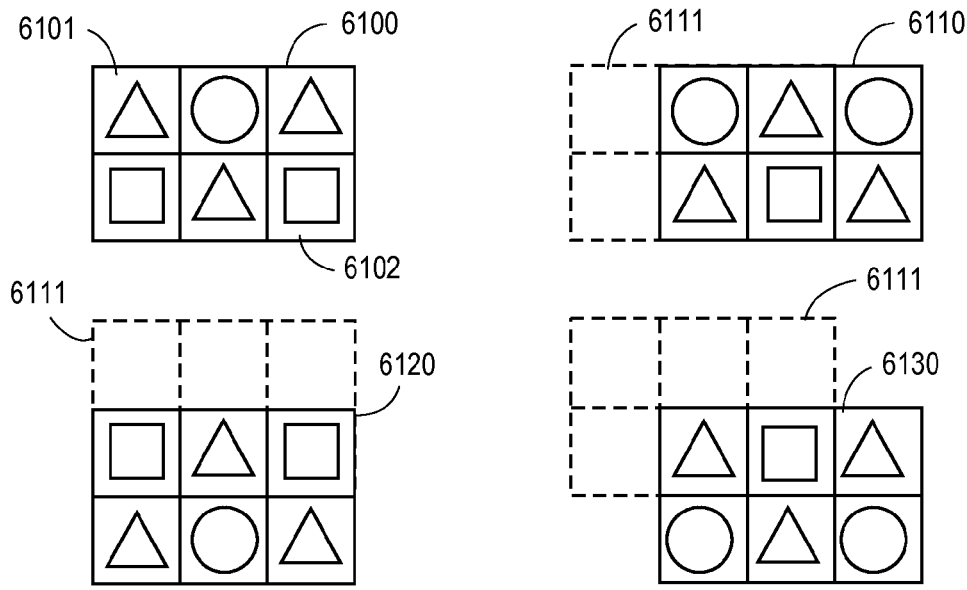
FIGS. 6B-F illustrate one example of an embodiment of projecting optical samples captured using optical image stabilization onto a high resolution grid.

At FIG. 6B, the image sensor captures the scene at a reference optical path as reference optical sample 6100. Pixels comprising the reference optical sample 6100 are illustrated at FIG. 6B with no fill pattern and with a respective green 6010, red 6020 or blue 6030 value. Thereafter, the OIS processor commands the actuator to cause a shift of the optical path to the image sensor of one pixel along the horizon plane and a color sampling density optical sample 6110 is captured (represented by new the green 6010, red 6020 or blue 6030 value at each pixel location of sample 6110). This process is repeated to capture color sampling density optical samples 6120 and 6130, though with different shifts for each optical sample to ensure that the color sampling density is sufficient. Accordingly, each color value may be captured for the scene. Each optical sample 6110-6430 is shown with a respective offset from the reference optical path 6111 represented in the reference optical sample 6100.

Figure 6C:
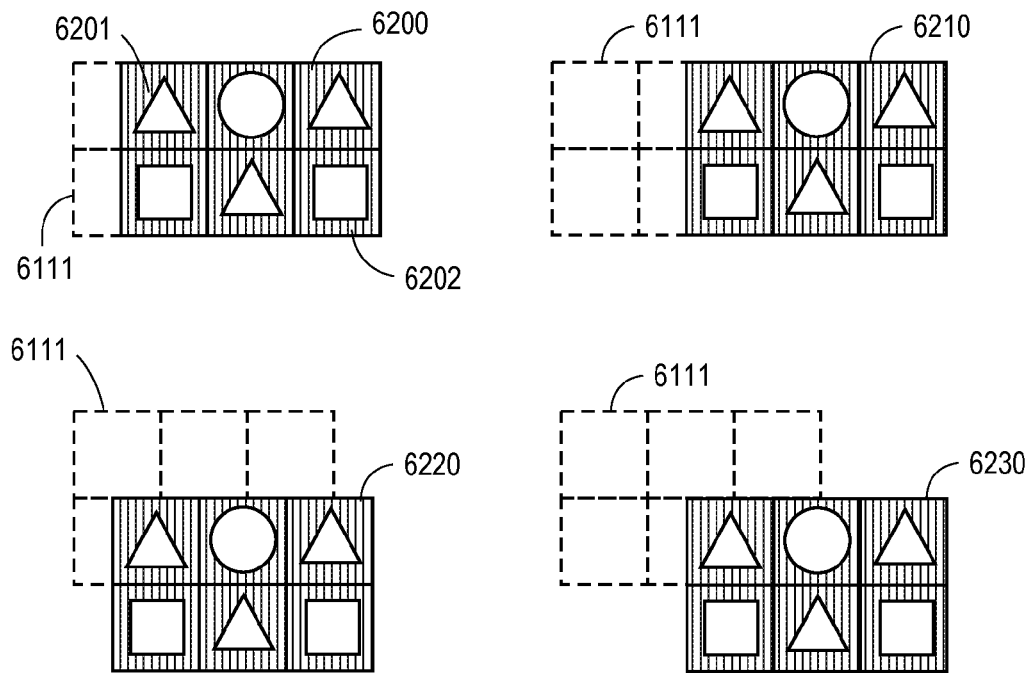
Figure 6D:
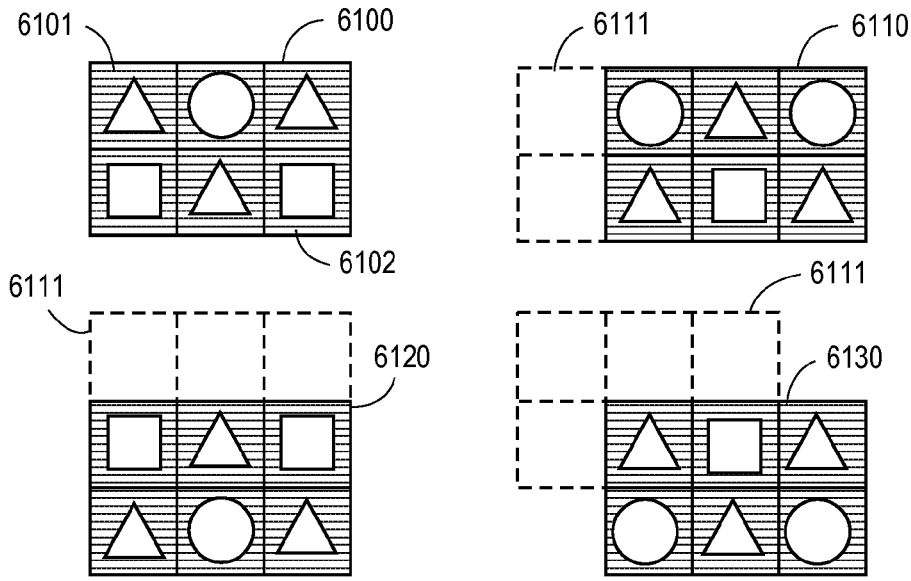
Figure 6E:
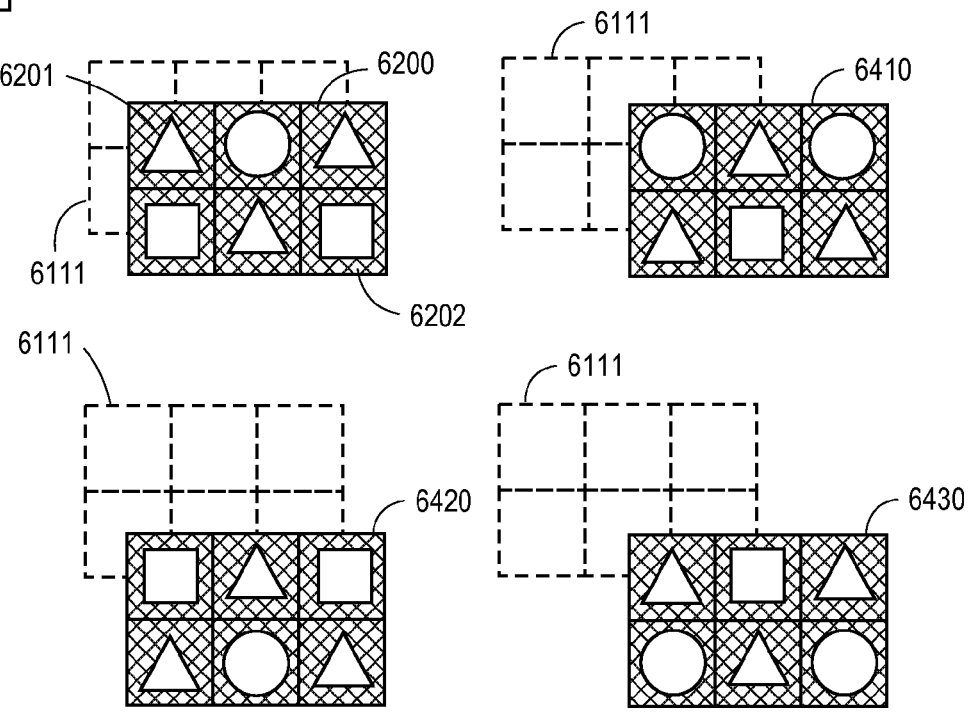

To increase the pixel sampling density, the OIS processor commands the actuator to cause a shift of the optical path to the image sensor of one half pixel to the right along the horizon plane. Here, the image sensor captures the scene as a first pixel sampling density optical sample 6200 at FIG. 6C. Pixels comprising the first pixel sampling density optical sample 6200 are illustrated at FIG. 6C with vertical stripes and with a respective green 6010, red 6020 or blue 6030 value. Thereafter, the OIS processor commands the actuator to cause a shift of the optical path to the image sensor of one pixel along the horizon plane and a color sampling density optical sample 6210 is captured (represented by new the green 6010, red 6020 or blue 6030 value at each pixel location). This process is repeated to capture color sampling density optical samples 6220 and 6230, though with different shifts for each optical sample to ensure that the color sampling density is sufficient. Accordingly, each color value is captured for the scene. FIGS. 6D and 6E illustrate optical samples captured in a manner analogous to that presented with respect to FIGS. 6B and 6C (each comprised of pixels with horizontal stripes and diagonal stripes, respectively). However, the offset of each optical sample in the series of optical samples 6300-6430 will vary according to the commanded shift, e.g. the OIS processor may command a 1.5 pixel shift along the picture plane and no shift along the horizon plane to capture optical sample 6320.

Figure 6F:
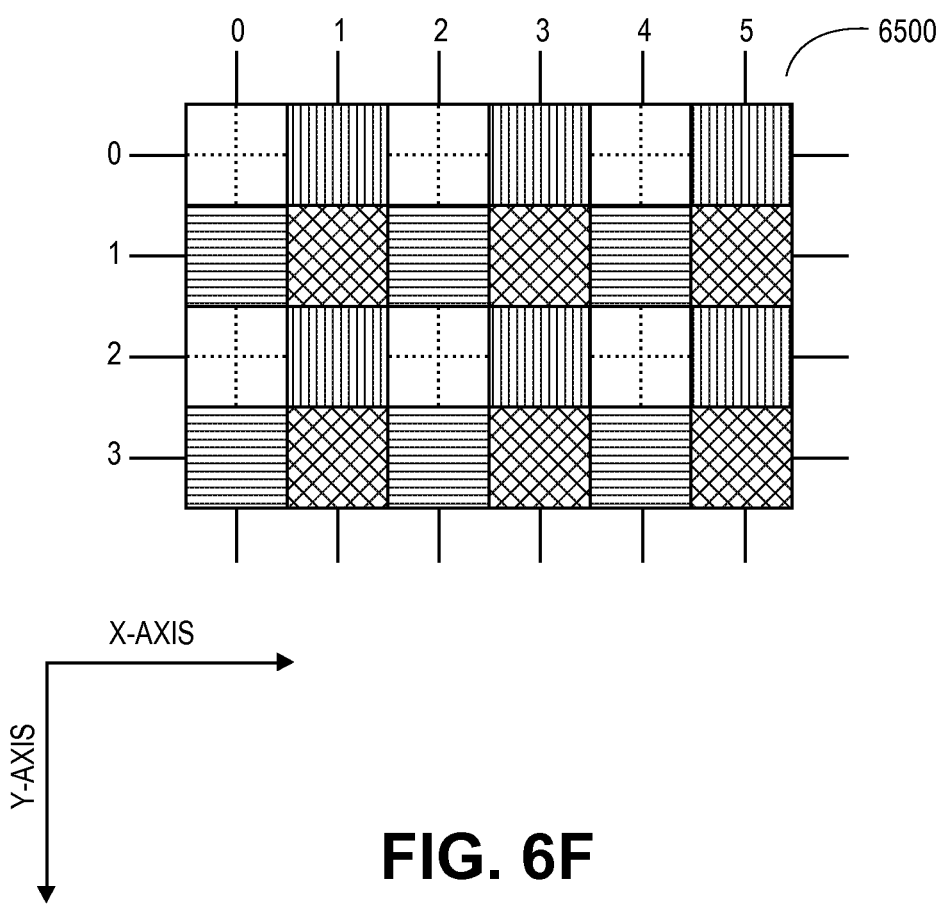

At FIG. 6F, the optical samples are projected onto a high resolution grid 6500. While high resolution grid 6500 is illustrated as a Cartesian plane of x and y coordinates, the optical samples may be projected onto other coordinate planes, such as polar or circular. The optical samples may be projected directly onto the high resolution grid, bypassing image registration on a coarse pixel and/or sub-pixel grid. Because the OIS processor is precisely calibrated (e.g., by a calibration method) to command an accurate sub-pixel shift (e.g., the direction and magnitude of the sub-pixel shift are controlled), the offsets of each optical sample are already known (relative to one another or relative to the reference optical sample).

The optical samples may be projected onto the high resolution grid 6500 in a manner that allows the pixels of the pixel sampling density optical samples 6200-6430 to be projected onto the grid 6500 at locations between the reference optical sample pixels. The reference optical sample 6100 may be first projected onto the high resolution grid 6500. The upper leftmost pixel 6101 may be projected onto an origin coordinate (x=0, y=0) of the high resolution grid 6500. Thereafter, the projected origin pixel may be combined with the unique color data from the corresponding pixels (here, the upper leftmost pixels) of the color-density reference optical samples 6110, 6120 and 6130 so that the pixel projected at the origin has complete values for red, green and blue (n.b., a green 6010, red 6020 or blue 6030 value is absent from the final pixel projected onto the high resolution grid 6500 to indicate the pixel is fully sampled for each color).

Similarly, the lower rightmost pixel 6102 may be projected onto the coordinate (x=3, y=5) of the high resolution grid 6500. Thereafter, this projected pixel may be combined with the unique color data from the corresponding pixels (here, the lower rightmost pixels) of the color-density reference optical samples 6110, 6120 and 6130 so that the pixel projected at coordinate (x=3, y=5) has complete values for red, green and blue. Accordingly, each pixel from the reference optical sample may be projected onto the high resolution grid 6500 and each respective pixel may have complete color data. In this way, each pixel of the reference optical sample 6100 is projected onto the grid 6500 with complete color data.

Each pixel density optical sample 6200-6430 may then be projected onto the grid 6500 to complete the high resolution image. The first pixel sampling density optical sample 6200 is projected onto the grid 6500. Because the sub-pixel offset of optical sample 6200 is accurately known, pixel 6201 can be projected to coordinate (x=1, y=0) on the grid 6500. Thereafter, this projected pixel may be combined with the unique color data from the pixels of the color-density optical samples 6210, 6220 and 6230 so that the pixel projected at coordinate (x=1, y=0) has complete values for red, green and blue. In this way, each pixel from the optical samples 6100-6430 may be projected onto the high resolution grid 6500 and each respective pixel may have complete color data (n.b., a green 6010, red 6020 or blue 6030 value is absent from each final pixel projected on the high resolution grid 6500 to indicate the pixel is fully sampled for each color). The completed high resolution grid 6500 represents a fully sampled high resolution image that may then be processed (e.g., through deconvolution and color processing) without demosaicing to create a super-resolution image.

Figure 7:
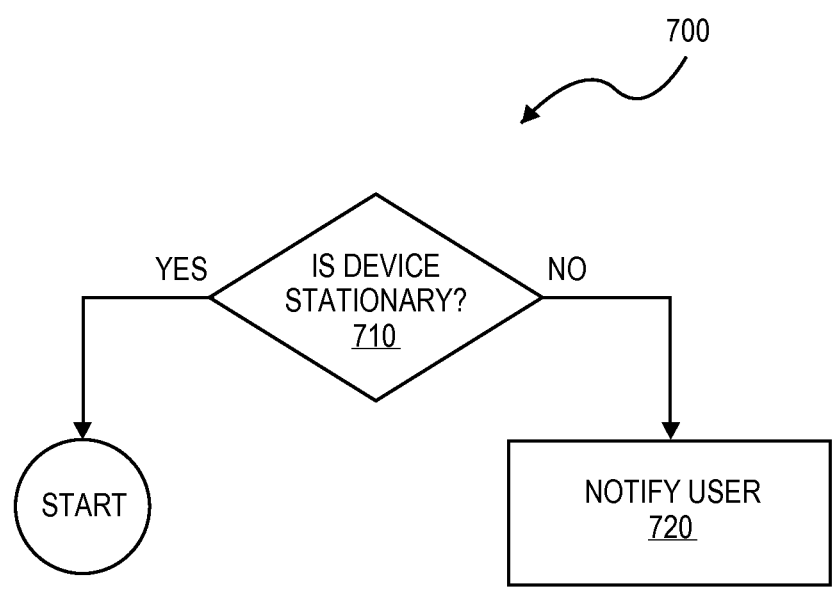
FIG. 7 is a flow diagram illustrating one example of an embodiment for determining whether to create a super-resolution image using optical image stabilization.

In some embodiments, an image capturing device may only be operable to create a super-resolution image if one or more conditions are satisfied. FIG. 7 illustrates a method 700 that may predicate the creation of a super-resolution image. The method 600 of FIG. 6A may be contingent upon the method 700 of FIG. 7. The method 700 may be performed in the image capturing device 100 of FIG. 1 and/or the image capturing device 300 of FIG. 3, or other device implementing optical image stabilization.

The method 700 may be triggered by input indicating from a user of the image capturing device indicating that the user desires the image capturing device to create a super-resolution image (e.g., through method 600). Thus, the user may cause the image capturing device to perform method 700 by activating a tactile button for shutter release, or selecting an option for image capture presented to the user on a display of the image capturing device.

In some embodiments, the image capturing device must be approximately stationary in order for the OIS processor to command accurately known sub-pixel shifts. If the optical path to the image sensor is being varied (e.g., the user is moving the image capturing device) while the image capturing device is capturing optical samples, then the optical samples may need to be registered in order to project the optical samples onto a high resolution grid, or the user may vary the optical path by such an amount that image registration of the optical samples is impossible. Therefore, the method 700 begins by determining if the image capturing device is approximately stationary (decision block 710). This evaluation may depend upon the output of an inertial sensor (which may comprise a gyroscope and/or accelerometer) within the image capturing device. An OIS processor within the image capturing device may receive input from the inertial sensor and evaluate if that input is at or beyond a predetermined threshold that indicates the image capturing device is not approximately stationary. The OIS processor may also make this evaluation in the absence of input, e.g. where no voltage has been received from the inertial sensor, the OIS processor may determine the device is approximately stationary. In some embodiments, this evaluation (decision block 710) may be based on other factors, such as a position sensor or electrical signals received at an image sensor of the image capturing device.

Where it is determined that the image capturing device is not approximately stationary, the image capturing device may be operable to notify the user (operation 720). The image capturing device may present a notification to the user on a display of the device indicating that the device is not sufficiently stationary to capture a super-resolution image. The user may then need to stabilize the device so that it is sufficiently stationary before activating a shutter release again. In some embodiments, an audio notification may be presented to the user.

Where it is determined that the image capturing device is approximately stationary, the image capturing device may proceed to create a super-resolution image as shown by the method 600 of FIG. 6A.

Figure 8:
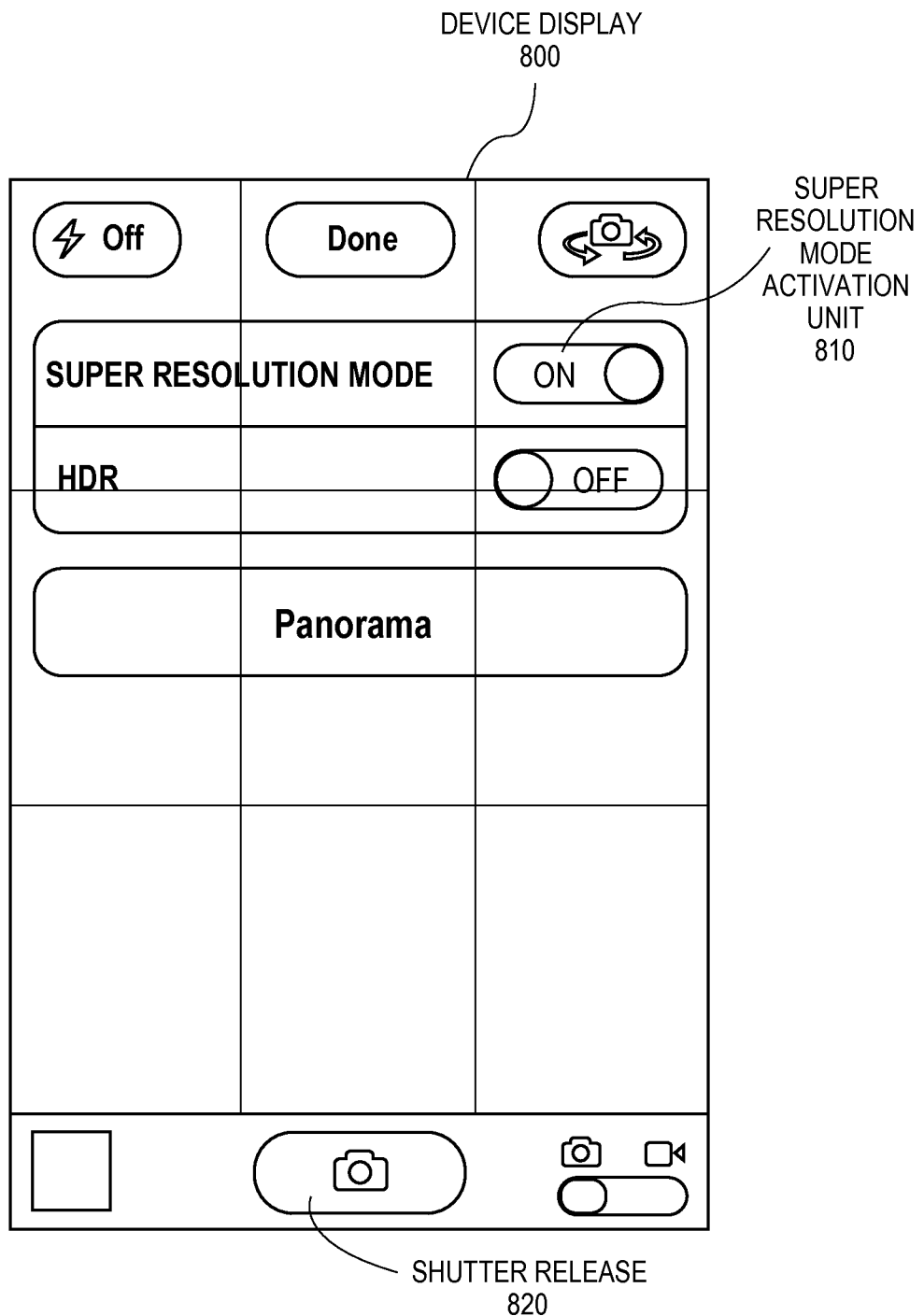
FIG. 8 is a block diagram illustrating one example of an embodiment of a display of an image capturing device.

In some embodiments, the image capturing device must be set to create a super-resolution image. This setting may be activated in response to user input, such as by presenting to the user an option to create a super-resolution image. FIG. 8 illustrates one embodiment of this setting. The image capturing device may present an option to activate a super resolution mode at a display of the device 800. The device may receive user input indicating that the user desires to create a super-resolution image, such as by activating a super-resolution mode activation unit 810. In some embodiments, the user input to activate the super-resolution mode may be received by other means, such as a button, switch, or other tactile component. In some embodiments, the device must first be operable as a camera (e.g., in camera mode) in order for the device to present the super-resolution mode activation unit 810. When the user has activated super-resolution mode, the device may receive input from the user to begin capturing optical samples. This input may be received where the user presses shutter release 820.

Figure 9:
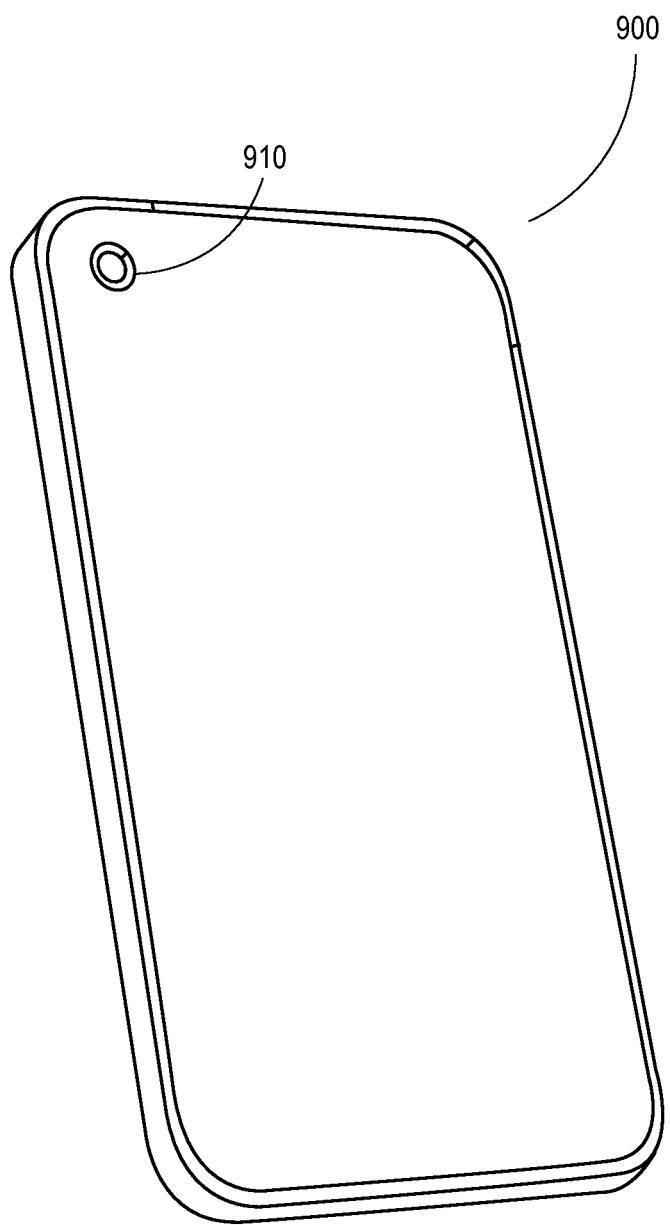
FIG. 9 illustrates one embodiment of an image capturing device with an OIS system.

Turning now to FIG. 9, a block diagram is shown illustrating an embodiment of an image capturing device 900. The image capturing device 900 illustrates the housing for the components of an image capturing device implementing optical image stabilization. A lens 910 of the image capturing device 900 is here illustrated as visible from the housing. This image capturing device 910 may be the housing of the image capturing device 100 of FIG. 1 and/or the image capturing device 300 of FIG. 3, or other device implementing optical image stabilization.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An image capturing device comprising:
   an electronic image sensor operable to capture a plurality of optical samples through an optical path;
   a lens through which the optical path travels;
   an actuator that is operable to move the lens;
   an accelerometer;
   an optical image stabilization (OIS) processor to signal the actuator to move the lens so as to stabilize an optical image that is being projected onto the sensor through the optical path, before the sensor converts the optical image into digital form being said captured plurality of optical samples, in response to using the accelerometer to detect movement of the device due to involuntary shaking by a user who is holding the device;
   the OIS processor to command a plurality of super-resolution shifts of the optical path by signaling the actuator to move the lens while the plurality of optical samples are being captured, wherein each super-resolution shift corresponds to one of a plurality of sub-pixel offsets;
   a super-resolution engine to create a super-resolution image based on the plurality of captured optical samples;
   the OIS processor to command a plurality of increase color sampling density shifts of the optical path by signaling the actuator to move the lens while the plurality of optical samples are being captured, wherein each increase color sampling density shift corresponds to one of a plurality of one-pixel offsets to provide full color sampling at each pixel location of each color the image sensor is capable of capturing; and
   the super-resolution engine to create an increase color sampling density image based on the plurality of captured optical samples.

2. The image capturing device of claim 1 further comprising:
   a camera module to house the lens and the electronic image sensor.

3. The image capturing device of claim 2 wherein the OIS processor is to command a shift of the plurality of shifts of the optical path to the electronic image sensor by applying a voltage to an actuator that is operable to tilt the camera module.

4. The image capturing device of claim 3, wherein tilting the camera module comprises tilting the camera module to a plurality of tilt angles of the camera module about a pivot point.

5. The image capturing device of claim 4, further comprising a position sensor to one of (1) indicate a tilt angle of the camera module or (2) detect a shift in the pointing angle of the camera module.

6. The image capturing device of claim 2 wherein a back focal length of the camera module is fixed at no more than four millimeters and an f-number of the camera module is no more than four.

7. The image capturing device of claim 2, wherein the OIS processor is to command the shifts of the optical path to the electronic image sensor by applying a known voltage to an actuator that is operable to do one of tilt the camera module or translate the lens, wherein the voltage applied to the actuator determines a magnitude of the respective one of the tilting of the camera module and the translating of the lens.

8. The image capturing device of claim 7, wherein the known voltage is the product of a sub-pixel shift coefficient and a predetermined sub-pixel shift amount.

9. The image capturing device of claim 1 wherein the OIS processor is to command a shift of the plurality of shifts of the optical path to the electronic image sensor by applying a voltage to an actuator that is operable to translate the lens.

10. The image capturing device of claim 9, wherein translating the lens comprises translating the lens linearly across one of a horizontal plane or a vertical plane.

11. The image capturing device of claim 10, further comprising a position sensor to detect translating the lens to a plurality of positions of the lens with respect to the image sensor.

12. The image capturing device of claim 1 wherein a first optical sample captured is a reference optical sample and wherein the respective sampling offset for each optical sample of the plurality is with respect to the reference optical sample.

13. The image capturing device of claim 12 wherein the plurality of shifts comprise a plurality of known shifts that comprise a first shift corresponding to one-half pixel along a horizon plane and a second shift corresponding to one-half pixel along a picture plane.

14. The image capturing device of claim 12 wherein the OIS processor is to command a respective shift so that an offset pixel of an offset optical sample corresponding to a reference pixel of the reference optical sample comprises different color data.

15. The image capturing device of claim 1, wherein a control circuitry is further to determine that the image capturing device is stationary using an inertial sensor and to activate the OIS processor in response to determining that the image capturing device is stationary.

16. The image capturing device of claim 1, further comprising a position sensor to detect each shift that corresponds to one of a plurality of sub-pixel offsets.

17. The image capturing device of claim 1, wherein the plurality of super resolution sub pixel offsets are determined by a calibration procedure that compares a reference sample to a target sample to determine the commands of the plurality of super resolution shifts, and that is (1) performed after manufacture of the device and (2) initiated by a user input.

18. The image capturing device of claim 1, wherein the OIS processor determines that (1) the device is approximately stationary or (2) the user is varying the optical path by an amount that does not make registration of the plurality of captured optical samples impossible; and wherein creating the super resolution engine comprises registering the plurality of captured optical samples in order to project the samples onto a high resolution grid.

19. The image capturing device of claim 1, wherein the super-resolution engine is to create a combined super-resolution and increased color sampling density image based on a plurality of captured optical samples captured when the OIS processor is to command a plurality of combined shifts of the optical path that are the super-resolution shifts combined with the increased color sampling density shifts.

20. An article of manufacture comprising a non-transitory machine readable storage medium in which are stored executable program instructions that program an image capturing device to:
    capture, using an image sensor, a plurality of optical samples along a plurality of optical paths obtained by signaling an actuator to move a lens located in front of the image sensor so as to stabilize an optical image that is being projected onto the sensor through an optical path, before the sensor converts the optical image into digital form being said captured plurality of optical samples, in response to using an accelerometer to detect movement of the device due to involuntary shaking by a user who is holding the device;
    command, using an optical image stabilization (OIS) processor, a plurality of super resolution shifts of the optical path, wherein the super resolution shifts correspond to sub-pixel offsets, and wherein the command of the super resolution shifts comprises signaling the actuator to move the lens while the plurality of optical samples are being captured;
    combine the plurality of optical samples to create a super-resolution images;
    command, using an optical image stabilization (OIS) processor, a plurality of increase color sampling density shifts of the optical path, wherein the increase color sampling density shifts correspond to one-pixel offsets to provide full color sampling at each pixel location of each color the image sensor is capable of capturing, and wherein the command of the increase color sampling density shifts comprises signaling the actuator to move the lens while the plurality of optical samples are being captured;
    combine the plurality of increase color sampling density samples to create a increase color sampling density image.

21. The apparatus of claim 20 further comprising instructions that program the image capturing device to:
    calibrate the OIS processor to sub-pixel accuracy wherein the instructions that program the image capturing device to calibrate the OIS processor to sub-pixel accuracy comprise instructions to:
    capture, using the image sensor, a reference optical sample along a reference optical path;
    command, using the optical image stabilization (OIS) processor, a non-calibrated shift to the optical path from the reference optical path to a target optical path, wherein the non-calibrated shift is not associated with a known sub-pixel offset;
    capture, by the image sensor, a target optical sample along the target optical path;
    determine, with sub-pixel accuracy, a calibration offset of the target optical sample from the reference optical sample by registering the reference optical sample and the target optical sample on a sub-pixel grid; and
    calculate a sub-pixel coefficient using the non-calibrated shift and the calibration offset.

22. The apparatus of claim 21 wherein the sub-pixel coefficient is calculated as a quotient of a voltage applied to an actuator by the OIS processor divided by the calibration offset.

23. The apparatus of claim 20, further comprising instructions that program the image capturing device to detect each shift that corresponds to sub-pixel offsets using a position sensor.

24. A method for capturing a super-resolution image by an image capturing device, comprising:
    capturing, using an image sensor, a plurality of optical samples along a plurality of optical paths obtained by signaling an actuator to move a lens located in front of the image sensor so as to stabilize an optical image that is being projected onto the sensor through an optical path, before the sensor converts the optical image into digital form being said captured plurality of optical samples, in response to using an accelerometer to detect movement of the device due to involuntary shaking by a user who is holding the device;
    commanding a plurality of calibrated super resolution shifts of the optical path to the image sensor by an optical image stabilization (OIS) processor, wherein the plurality of calibrated super resolution shifts are associated with sub-pixel offsets, and wherein the command of the plurality of calibrated super resolution shifts comprises signaling the actuator to move the lens while the plurality of optical samples are being captured;
    combining the plurality of optical samples to create a densely sampled image;
    commanding a plurality of calibrated increase color sampling density shifts of the optical path to the image sensor by an optical image stabilization (OIS) processor, wherein the plurality of calibrated increase color sampling density shifts are associated with one-pixel offsets to provide full color sampling at each pixel location of each color the image sensor is capable of capturing, and wherein the command of the plurality of calibrated increase color sampling density shifts comprises signaling the actuator to move the lens while the plurality of optical samples are being captured; and
    combining the plurality of optical samples to create a increase color sampling densely sampled image.

25. The method of claim 24, wherein the plurality of optical samples are a first plurality of optical samples, and further comprising:
    commanding a second calibrated shift of the optical path to the image sensor by the optical image stabilization (OIS) processor, wherein the second calibrated shift is associated with a single-pixel offset;
    capturing, by the image sensor, a third optical sample through the second shifted optical path such that the third optical sample is offset from the first optical path by approximately one pixel; and combining the first, second, and third optical samples to increase the sampling density of the densely sampled image.

26. The method of claim 24, wherein the plurality of optical samples are a first plurality of optical samples, and further comprising:

commanding a plurality of calibrated shifts of the optical path to the image sensor by the optical image stabilization (OIS) processor, wherein a respective calibrated shift is associated with a respective offset;

capturing, by the image sensor, a plurality of optical samples through the plurality of shifted optical paths wherein a respective optical sample is offset from the first optical sample by the respective offset.

27. The method of claim 26, further comprising:

combining the first optical sample, the second optical sample and the plurality of optical samples to create the densely sampled image; and creating a fully sampled super-resolution image from the densely sampled image, wherein the densely sampled image is not demosaiced.

28. The method of claim 26, wherein the first optical sample, the second optical sample and the plurality of optical samples are combined to create the densely sampled imaged without registering the first optical sample, the second optical sample and the plurality of optical samples on a sub-pixel grid.

29. The method of claim 24, further comprising detecting each plurality of calibrated shifts that are associated with sub-pixel offsets using a position sensor.

* * * * *